(12) United States Patent
Muirhead

(10) Patent No.: US 9,230,227 B2
(45) Date of Patent: Jan. 5, 2016

(54) PALLET

(71) Applicant: Nextreme, LLC, Uniontown, PA (US)

(72) Inventor: Scott A. W. Muirhead, Surrey (CA)

(73) Assignee: Nextreme, LLC, Uniontown, PA (US)

( * ) Notice: Subject to any disclaimer, the term of this patent is extended or adjusted under 35 U.S.C. 154(b) by 0 days.

(21) Appl. No.: 14/526,025

(22) Filed: Oct. 28, 2014

(65) Prior Publication Data

US 2015/0046205 A1 Feb. 12, 2015

Related U.S. Application Data

(63) Continuation of application No. 13/506,846, filed on May 21, 2012, which is a continuation of application No. 13/068,943, filed on May 25, 2011, which is a continuation-in-part of application No. 11/981,091, (Continued)

(51) Int. Cl.
*G08B 1/08* (2006.01)
*G06Q 10/06* (2012.01)
(Continued)

(52) U.S. Cl.
CPC ........ *G06Q 10/0631* (2013.01); *B65D 19/0016* (2013.01); *B65D 19/38* (2013.01); *G06K 19/07758* (2013.01); *G06K 19/07792* (2013.01); *G06Q 50/28* (2013.01); *G08B 13/2474* (2013.01); *H01Q 1/2225* (2013.01); *H01Q 21/24* (2013.01); *H01Q 21/28* (2013.01); *H04W 4/02* (2013.01); *B65D 2203/10* (2013.01); *B65D 2519/00034* (2013.01);

(Continued)

(58) Field of Classification Search
USPC .............. 340/539.1, 539.11, 539.13, 506, 3.1
See application file for complete search history.

(56) References Cited

U.S. PATENT DOCUMENTS 3,398,434 A 8/1968 Alesi, Jr. et al.
3,583,036 A 6/1971 Brown
(Continued)

FOREIGN PATENT DOCUMENTS

DE 4313049 A1 10/1994
DE 4334668 A1 4/1995
(Continued)

OTHER PUBLICATIONS

"Fire and Polyvinyl Chloride", The Vinyl Institute, 1996, pp. 1-16.
(Continued)

*Primary Examiner* — Daryl Pope
(74) *Attorney, Agent, or Firm* — Harness, Dickey & Pierce, P.L.C.

(57) ABSTRACT

A material handling apparatus including pallets developed to operate in radio frequency rich environments. Pallets are provided having at least one large compartment capable of enclosing at least one electronic device or a package populated with a plurality of devices. The devices include RFID pallet tags that communicate with RFID item tags and RFID beacon tags positioned within distributed RFID networks. The devices include sensors to monitor pallet conditions to which a pallet management system is responsive. The devices include wireless transceivers for communicating indicative information through LAN, WLAN and Cellular communications networks. An antenna array operating on different radio frequency signals is provided. The apparatus includes a power resource in order to facilitate long term autonomous operation.

24 Claims, 11 Drawing Sheets

Related U.S. Application Data filed on Oct. 31, 2007, now Pat. No. 8,077,040, which is a continuation of application No. 11/152,628, filed on Jun. 14, 2005, now Pat. No. 7,342,496, which is a continuation-in-part of application No. 09/770,097, filed on Jan. 24, 2001, now Pat. No. 6,943,678.

(60) Provisional application No. 60/177,383, filed on Jan. 24, 2000.

(51) Int. Cl.
| | |
|---|---|
| *B65D 19/00* | (2006.01) |
| *B65D 19/38* | (2006.01) |
| *G06K 19/077* | (2006.01) |
| *G08B 13/24* | (2006.01) |
| *H01Q 1/22* | (2006.01) |
| *H01Q 21/24* | (2006.01) |
| *H01Q 21/28* | (2006.01) |
| *G06Q 50/28* | (2012.01) |
| *H04W 4/02* | (2009.01) |
| *H04W 88/06* | (2009.01) |

(52) U.S. Cl.
CPC ............... *B65D 2519/00069* (2013.01); *B65D 2519/00139* (2013.01); *B65D 2519/00273* (2013.01); *B65D 2519/00293* (2013.01); *B65D 2519/00303* (2013.01); *B65D 2519/00323* (2013.01); *B65D 2519/00333* (2013.01); *B65D 2519/00358* (2013.01); *B65D 2519/00437* (2013.01); *B65D 2519/00442* (2013.01); *B65D 2519/00562* (2013.01); *B65D 2519/00567* (2013.01); *H04W 88/06* (2013.01); *Y02W 30/807* (2015.05); *Y10T 29/49826* (2015.01)

(56) References Cited

U.S. PATENT DOCUMENTS

| | | |
|---|---|---|
| 3,597,799 A | 8/1971 | Earle |
| 3,695,188 A | 10/1972 | Granatstein |
| 3,702,100 A | 11/1972 | Wharton |
| 3,719,157 A | 3/1973 | Arcocha et al. |
| 3,757,704 A | 9/1973 | Allgeyer et al. |
| 3,779,687 A | 12/1973 | Alesi |
| 3,783,078 A | 1/1974 | Brodhead |
| 3,787,158 A | 1/1974 | Brown et al. |
| 3,810,862 A | 5/1974 | Mathis et al. |
| 3,867,088 A | 2/1975 | Brown et al. |
| 3,868,209 A | 2/1975 | Howell |
| 3,919,382 A | 11/1975 | Smarook |
| 3,919,445 A | 11/1975 | Smarook |
| 3,919,446 A | 11/1975 | Smarook |
| 3,925,140 A | 12/1975 | Brown |
| 3,964,400 A | 6/1976 | Brand |
| 4,013,021 A | 3/1977 | Steinlein et al. |
| 4,070,839 A | 1/1978 | Clem |
| 4,079,232 A | 3/1978 | Brokoff et al. |
| 4,101,252 A | 7/1978 | Brown |
| 4,113,909 A | 9/1978 | Beasley |
| 4,133,270 A | 1/1979 | Ravera |
| 4,158,539 A | 6/1979 | Arends et al. |
| 4,164,387 A | 8/1979 | Schermutzki et al. |
| 4,164,389 A | 8/1979 | Beasley |
| 4,194,663 A | 3/1980 | West et al. |
| 4,220,100 A | 9/1980 | Palomo et al. |
| 4,244,915 A | 1/1981 | Boardman |
| 4,255,382 A | 3/1981 | Arends et al. |
| 4,287,836 A | 9/1981 | Aoki |
| 4,348,442 A | 9/1982 | Figge |
| 4,377,377 A | 3/1983 | Arends et al. |
| 4,428,306 A | 1/1984 | Dresen et al. |
| 4,464,329 A | 8/1984 | Whiteside et al. |
| 4,488,496 A | 12/1984 | Polacco |
| 4,500,213 A | 2/1985 | Grimm |
| 4,507,348 A | 3/1985 | Nagata et al. |
| 4,509,432 A | 4/1985 | Win |
| 4,509,909 A | 4/1985 | Arends |
| 4,513,048 A | 4/1985 | Kaube et al. |
| 4,531,901 A | 7/1985 | Andersen |
| 4,555,381 A | 11/1985 | Chazal et al. |
| 4,600,376 A | 7/1986 | Gillman et al. |
| 4,606,278 A | 8/1986 | Shuert |
| 4,608,009 A | 8/1986 | Whiteside et al. |
| 4,636,348 A | 1/1987 | Whiteside |
| 4,649,007 A | 3/1987 | Bonis et al. |
| 4,666,544 A | 5/1987 | Whiteside et al. |
| 4,727,102 A | 2/1988 | Scarso |
| 4,742,781 A | 5/1988 | Shuert |
| 4,801,347 A | 1/1989 | Garwood |
| 4,846,077 A | 7/1989 | Win |
| 4,879,956 A | 11/1989 | Shuert |
| 4,907,515 A | 3/1990 | Win |
| 4,969,812 A | 11/1990 | Brown |
| 5,007,225 A | 4/1991 | Teasdale |
| 5,030,501 A | 7/1991 | Colvin et al. |
| 5,042,396 A | 8/1991 | Shuert |
| 5,046,434 A | 9/1991 | Breezer et al. |
| 5,071,603 A | 12/1991 | Kurumaji et al. |
| 5,088,418 A | 2/1992 | Reckermann et al. |
| 5,108,529 A | 4/1992 | Shuert |
| 5,117,762 A | 6/1992 | Shuert |
| 5,123,359 A | 6/1992 | DelBalso |
| 5,123,541 A | 6/1992 | Giannini et al. |
| 5,143,778 A | 9/1992 | Shuert |
| 5,156,782 A | 10/1992 | Ballantyne |
| 5,164,211 A | 11/1992 | Comer |
| 5,167,969 A | 12/1992 | DeMaio, Jr. et al. |
| 5,168,817 A | 12/1992 | Nulle et al. |
| 5,197,395 A | 3/1993 | Pigott et al. |
| 5,197,396 A | 3/1993 | Breezer et al. |
| 5,205,221 A | 4/1993 | Melin et al. |
| 5,225,213 A | 7/1993 | Brown et al. |
| 5,226,373 A | 7/1993 | Esch |
| 5,229,648 A | 7/1993 | Sues et al. |
| 5,252,024 A | 10/1993 | Breda et al. |
| 5,255,613 A | 10/1993 | Shuert |
| 5,283,028 A | 2/1994 | Breezer et al. |
| 5,283,029 A | 2/1994 | Ellemor |
| 5,329,861 A | 7/1994 | McCarthy |
| 5,329,862 A | 7/1994 | Breezer et al. |
| 5,337,681 A | 8/1994 | Schrage |
| 5,351,627 A | 10/1994 | Junaedi |
| 5,351,628 A | 10/1994 | Breezer et al. |
| 5,351,629 A | 10/1994 | Breezer et al. |
| 5,356,983 A | 10/1994 | Vijayendran et al. |
| 5,367,960 A | 11/1994 | Schleicher |
| 5,367,961 A | 11/1994 | Arai et al. |
| 5,390,467 A | 2/1995 | Shuert |
| 5,391,251 A | 2/1995 | Shuert |
| 5,401,347 A | 3/1995 | Shuert |
| 5,402,735 A | 4/1995 | DeJean |
| 5,404,829 A | 4/1995 | Shuert |
| 5,407,632 A | 4/1995 | Constantino et al. |
| 5,408,937 A | 4/1995 | Knight, IV et al. |
| 5,413,052 A | 5/1995 | Breezer et al. |
| 5,427,732 A | 6/1995 | Shuert |
| 5,448,110 A | 9/1995 | Tuttle et al. |
| 5,470,641 A | 11/1995 | Shuert |
| 5,479,416 A | 12/1995 | Snodgrass et al. |
| 5,486,405 A | 1/1996 | Laves |
| 5,492,069 A | 2/1996 | Alexander et al. |
| 5,505,141 A | 4/1996 | Barber |
| 5,517,188 A | 5/1996 | Carroll et al. |
| 5,527,585 A | 6/1996 | Needham et al. |
| 5,531,585 A | 7/1996 | Lupke |
| 5,535,668 A | 7/1996 | Besaw et al. |
| 5,539,775 A | 7/1996 | Tuttle et al. |
| 5,555,820 A | 9/1996 | Shuert |
| 5,565,846 A | 10/1996 | Geiszler et al. |
| 5,565,858 A * | 10/1996 | Guthrie ............. 340/10.33 |
| 5,566,624 A | 10/1996 | Brown et al. |
| 5,583,819 A | 12/1996 | Roesner et al. |

(56) References Cited

U.S. PATENT DOCUMENTS

| | | |
|---|---|---|
| 5,596,933 A | 1/1997 | Knight et al. |
| 5,606,921 A | 3/1997 | Elder et al. |
| 5,620,715 A | 4/1997 | Hart et al. |
| 5,624,622 A | 4/1997 | Boyce et al. |
| 5,624,630 A | 4/1997 | Breezer et al. |
| 5,635,129 A | 6/1997 | Breezer et al. |
| 5,635,306 A | 6/1997 | Minamida et al. |
| 5,638,760 A | 6/1997 | Jordan et al. |
| 5,648,031 A | 7/1997 | Sturtevant et al. |
| 5,649,295 A | 7/1997 | Shober et al. |
| 5,657,007 A | 8/1997 | Anderson et al. |
| 5,658,523 A | 8/1997 | Shuert |
| 5,661,457 A | 8/1997 | Ghaffari et al. |
| 5,662,048 A | 9/1997 | Kralj et al. |
| 5,664,322 A | 9/1997 | Best |
| 5,676,064 A | 10/1997 | Shuert |
| 5,686,928 A | 11/1997 | Pritchett et al. |
| 5,687,532 A | 11/1997 | Torrey |
| 5,687,652 A | 11/1997 | Ruma |
| 5,708,423 A | 1/1998 | Ghaffari et al. |
| 5,716,581 A | 2/1998 | Tirrell et al. |
| 5,728,424 A | 3/1998 | Walling |
| 5,730,252 A | 3/1998 | Herbinet |
| 5,755,162 A | 5/1998 | Knight et al. |
| 5,758,855 A | 6/1998 | Jordan et al. |
| 5,769,003 A | 6/1998 | Rose et al. |
| 5,774,876 A | 6/1998 | Woolley et al. |
| 5,778,801 A | 7/1998 | Delacour |
| 5,782,129 A | 7/1998 | Vanderzee et al. |
| 5,791,262 A | 8/1998 | Knight et al. |
| 5,794,542 A | 8/1998 | Besaw |
| 5,794,544 A | 8/1998 | Shuert |
| 5,800,846 A | 9/1998 | Hart |
| 5,804,810 A | 9/1998 | Woolley et al. |
| 5,806,436 A | 9/1998 | Weichenrieder, Sr. et al. |
| 5,812,951 A | 9/1998 | Ganesan et al. |
| 5,813,355 A | 9/1998 | Brown et al. |
| 5,814,185 A | 9/1998 | Chun et al. |
| 5,818,348 A | 10/1998 | Walczak et al. |
| 5,822,683 A | 10/1998 | Paschen |
| 5,822,714 A | 10/1998 | Cato |
| 5,828,737 A | 10/1998 | Sawyer |
| 5,830,299 A | 11/1998 | Teixidor Casanovas et al. |
| 5,834,535 A | 11/1998 | Abu-Isa et al. |
| 5,836,255 A | 11/1998 | Uitz |
| 5,839,056 A | 11/1998 | Hakkinen |
| 5,843,366 A | 12/1998 | Shuert |
| 5,845,588 A | 12/1998 | Gronnevik |
| 5,860,369 A | 1/1999 | John et al. |
| 5,862,760 A | 1/1999 | Kohlhaas |
| 5,864,318 A | 1/1999 | Cosenza et al. |
| 5,868,080 A | 2/1999 | Wyler et al. |
| 5,875,393 A | 2/1999 | Altschul et al. |
| 5,879,495 A | 3/1999 | Evans |
| 5,885,691 A | 3/1999 | Breezer et al. |
| 5,894,803 A | 4/1999 | Kuga |
| 5,900,203 A | 5/1999 | Needham et al. |
| 5,908,135 A | 6/1999 | Bradford et al. |
| 5,921,189 A | 7/1999 | Estepp |
| 5,924,589 A | 7/1999 | Gordon |
| 5,929,779 A | 7/1999 | MacLellan et al. |
| 5,933,354 A | 8/1999 | Shimada et al. |
| 5,936,527 A | 8/1999 | Isaacman et al. |
| 5,942,987 A | 8/1999 | Heinrich et al. |
| 5,943,014 A | 8/1999 | Gilhousen |
| 5,946,878 A | 9/1999 | Grund et al. |
| 5,950,545 A | 9/1999 | Shuert |
| 5,950,546 A | 9/1999 | Brown et al. |
| 5,955,950 A | 9/1999 | Gallagher, III et al. |
| 5,959,568 A | 9/1999 | Woolley |
| 5,963,144 A | 10/1999 | Kruest |
| 5,965,848 A | 10/1999 | Altschul et al. |
| 5,967,057 A | 10/1999 | Nakayama et al. |
| 5,971,592 A | 10/1999 | Kralj et al. |
| 5,973,599 A | 10/1999 | Nicholson et al. |
| 5,975,879 A | 11/1999 | Dresen et al. |
| 5,980,231 A | 11/1999 | Arends et al. |
| 5,984,126 A | 11/1999 | Gordon |
| 5,986,569 A | 11/1999 | Mish et al. |
| 5,986,570 A | 11/1999 | Black et al. |
| 5,989,706 A | 11/1999 | McGinniss et al. |
| 5,993,724 A | 11/1999 | Shuert |
| 5,999,091 A | 12/1999 | Wortham |
| 6,006,677 A | 12/1999 | Apps et al. |
| 6,013,949 A | 1/2000 | Tuttle |
| 6,018,641 A | 1/2000 | Tsubouchi et al. |
| 6,018,927 A | 2/2000 | Major |
| 6,021,721 A | 2/2000 | Rushton |
| 6,025,780 A | 2/2000 | Bowers et al. |
| 6,026,304 A | 2/2000 | Hilsenrath et al. |
| 6,027,027 A | 2/2000 | Smithgall |
| 6,029,583 A | 2/2000 | LeTrudet |
| 6,034,639 A | 3/2000 | Rawlins et al. |
| 6,069,564 A | 5/2000 | Hatano et al. |
| 6,095,787 A | 8/2000 | Bills, Sr. |
| 6,107,698 A | 8/2000 | Ochiai et al. |
| 6,107,920 A | 8/2000 | Eberhardt et al. |
| 6,109,190 A | 8/2000 | Hale et al. |
| 6,110,559 A | 8/2000 | De Keyser |
| 6,138,582 A | 10/2000 | Fujii et al. |
| 6,138,859 A | 10/2000 | Aulph et al. |
| 6,147,662 A | 11/2000 | Grabau et al. |
| 6,172,608 B1 | 1/2001 | Cole |
| 6,172,609 B1 | 1/2001 | Lu et al. |
| 6,176,260 B1 | 1/2001 | Hahner et al. |
| 6,179,145 B1 | 1/2001 | Roth |
| 6,184,269 B1 | 2/2001 | Abu-Isa et al. |
| 6,199,488 B1 | 3/2001 | Favaron et al. |
| 6,212,401 B1 | 4/2001 | Ackley |
| 6,223,526 B1 | 5/2001 | Wissler et al. |
| 6,228,914 B1 | 5/2001 | Ford et al. |
| 6,240,365 B1 | 5/2001 | Bunn |
| 6,246,882 B1 | 6/2001 | Lachance |
| 6,255,949 B1 | 7/2001 | Nicholson et al. |
| 6,268,037 B1 | 7/2001 | Butler et al. |
| 6,276,387 B1 | 8/2001 | Pachciarz et al. |
| 6,278,413 B1 | 8/2001 | Hugh et al. |
| 6,293,420 B1 | 9/2001 | Richter et al. |
| 6,294,127 B1 | 9/2001 | Huse |
| 6,302,461 B1 | 10/2001 | Debras et al. |
| 6,305,568 B1 | 10/2001 | Suzuki et al. |
| 6,328,842 B1 | 12/2001 | Coninck et al. |
| 6,332,098 B2 | 12/2001 | Ross et al. |
| 6,338,420 B1 | 1/2002 | Pachciarz et al. |
| 6,344,508 B1 | 2/2002 | Endo et al. |
| 6,357,366 B1 | 3/2002 | Frankenberg |
| 6,372,079 B1 | 4/2002 | Coninck et al. |
| 6,372,176 B1 | 4/2002 | Ekendahl et al. |
| 6,379,606 B1 | 4/2002 | Chun et al. |
| 6,389,989 B1 | 5/2002 | Hagerty |
| 6,389,990 B1 | 5/2002 | Apps |
| 6,407,669 B1 | 6/2002 | Brown et al. |
| 6,424,300 B1 | 7/2002 | Sanford et al. |
| 6,441,740 B1 | 8/2002 | Brady et al. |
| 6,456,852 B2 | 9/2002 | Bar et al. |
| 6,458,232 B1 | 10/2002 | Valentinsson |
| 6,483,434 B1 | 11/2002 | UmiKer |
| 6,496,806 B1 | 12/2002 | Horwitz et al. |
| 6,542,114 B1 | 4/2003 | Eagleson et al. |
| 6,557,766 B1 | 5/2003 | Leighton |
| 6,563,417 B1 | 5/2003 | Shaw |
| 6,614,349 B1 | 9/2003 | Proctor et al. |
| 6,667,092 B1 | 12/2003 | Brollier et al. |
| 6,669,089 B2 | 12/2003 | Cybulski et al. |
| 6,687,238 B1 | 2/2004 | Soong et al. |
| 6,702,968 B2 | 3/2004 | Stevenson et al. |
| 6,710,891 B1 | 3/2004 | Vraa et al. |
| 6,717,516 B2 | 4/2004 | Bridgelall |
| 6,718,888 B2 | 4/2004 | Muirhead |
| 6,720,865 B1 | 4/2004 | Forster et al. |
| 6,720,866 B1 | 4/2004 | Sorrells et al. |
| 6,720,888 B2 | 4/2004 | Eagleson et al. |
| 6,724,306 B1 | 4/2004 | Parsley, Jr. et al. |
| 6,724,308 B2 | 4/2004 | Nicholson |

(56) References Cited

U.S. PATENT DOCUMENTS

| | | |
|---|---|---|
| 6,726,099 B2 | 4/2004 | Becker et al. |
| 6,735,630 B1 | 5/2004 | Gelvin et al. |
| 6,738,628 B1 | 5/2004 | McCall et al. |
| 6,743,319 B2 | 6/2004 | Kydd |
| 6,745,703 B2 | 6/2004 | Torrey et al. |
| 6,749,418 B2 | 6/2004 | Muirhead |
| 6,750,771 B1 | 6/2004 | Brand |
| 6,758,148 B2 | 7/2004 | Torrey et al. |
| 6,778,086 B2 | 8/2004 | Morrone et al. |
| 6,778,088 B1 | 8/2004 | Forster |
| 6,778,089 B2 | 8/2004 | Yoakum |
| 6,779,088 B1 | 8/2004 | Benveniste et al. |
| 6,784,234 B2 | 8/2004 | Adedeji et al. |
| 6,799,099 B2 | 9/2004 | Zeitler et al. |
| 6,801,833 B2 | 10/2004 | Pintsov et al. |
| 6,806,808 B1 | 10/2004 | Watters et al. |
| 6,809,703 B2 | 10/2004 | Serra |
| 6,812,824 B1 | 11/2004 | Goldinger et al. |
| 6,814,284 B2 | 11/2004 | Ehlers et al. |
| 6,814,287 B1 | 11/2004 | Chang et al. |
| 6,816,076 B2 | 11/2004 | Pomes |
| 6,817,522 B2 | 11/2004 | Brignone et al. |
| 6,830,181 B1 | 12/2004 | Bennett |
| 6,832,251 B1 | 12/2004 | Gelvin et al. |
| 6,844,857 B2 | 1/2005 | Loftus et al. |
| 6,847,892 B2 | 1/2005 | Zhou et al. |
| 6,849,677 B2 | 2/2005 | Overholt |
| 6,856,291 B2 | 2/2005 | Mickle et al. |
| 6,861,993 B2 | 3/2005 | Waldner |
| 6,865,516 B1 | 3/2005 | Richardson |
| 6,869,019 B1 | 3/2005 | Nagi et al. |
| 6,879,809 B1 | 4/2005 | Vega et al. |
| 6,879,876 B2 | 4/2005 | O'Dougherty et al. |
| 6,889,165 B2 | 5/2005 | Lind et al. |
| 6,895,221 B2 | 5/2005 | Gunnarsson |
| 6,895,255 B1 | 5/2005 | Bridgelall |
| 6,895,655 B2 | 5/2005 | Forster et al. |
| 6,897,827 B2 | 5/2005 | Senba et al. |
| 6,900,536 B1 | 5/2005 | Derbenwick et al. |
| 6,900,731 B2 | 5/2005 | Kreiner et al. |
| 6,900,762 B2 | 5/2005 | Andrews et al. |
| 6,903,656 B1 | 6/2005 | Lee |
| 6,903,704 B2 | 6/2005 | Forster et al. |
| 6,909,366 B1 | 6/2005 | Marsh et al. |
| 6,914,562 B2 | 7/2005 | Forster |
| 6,917,291 B2 | 7/2005 | Allen |
| 6,917,808 B1 | 7/2005 | Nelson |
| 6,922,059 B2 | 7/2005 | Zank et al. |
| 6,924,773 B1 | 8/2005 | Paratte |
| 6,924,777 B2 | 8/2005 | Reasoner et al. |
| 6,929,412 B1 | 8/2005 | Barrus et al. |
| 6,933,849 B2 | 8/2005 | Sawyer |
| 6,934,532 B2 | 8/2005 | Coppinger et al. |
| 6,934,540 B2 | 8/2005 | Twitchell, Jr. |
| 6,938,558 B1 | 9/2005 | Peres |
| 6,938,559 B2 | 9/2005 | Wullenweber |
| 6,940,392 B2 | 9/2005 | Chan et al. |
| 6,940,408 B2 | 9/2005 | Ferguson et al. |
| 6,940,455 B2 | 9/2005 | Plettner |
| 6,941,184 B2 | 9/2005 | Ebert |
| 6,943,678 B2 | 9/2005 | Muirhead |
| 6,947,513 B2 | 9/2005 | O'Toole et al. |
| 6,988,079 B1 | 1/2006 | Or-Bach et al. |
| 6,989,751 B2 | 1/2006 | Richards |
| 6,998,983 B2 | 2/2006 | Charych et al. |
| 7,075,435 B2 | 7/2006 | Jesser |
| 7,084,740 B2 | 8/2006 | Bridgelall |
| 7,271,726 B2 | 9/2007 | Hollon |
| 7,323,990 B2 | 1/2008 | Urban |
| 7,342,496 B2 | 3/2008 | Muirhead |
| 7,379,024 B2 | 5/2008 | Forster et al. |
| 7,450,007 B2 | 11/2008 | Cook et al. |
| 7,492,252 B2 | 2/2009 | Maruyama |
| 7,598,867 B2 | 10/2009 | Carrender |
| 7,841,281 B2 | 11/2010 | Valentinsson |
| 7,948,371 B2 | 5/2011 | Muirhead |
| 7,948,384 B1 | 5/2011 | Kennedy |
| 8,077,040 B2 | 12/2011 | Muirhead |
| 8,217,849 B2 | 7/2012 | Sardariani et al. |
| 8,228,201 B2 | 7/2012 | Kennedy |
| 2001/0013516 A1 | 8/2001 | Boecker |
| 2001/0020622 A1 | 9/2001 | Schmidt et al. |
| 2001/0045433 A1 | 11/2001 | Ellis |
| 2002/0017745 A1 | 2/2002 | Vorenkamp et al. |
| 2002/0020487 A1 | 2/2002 | Vorenkamp et al. |
| 2002/0020705 A1 | 2/2002 | Vorenkamp et al. |
| 2002/0021208 A1 | 2/2002 | Nicholson et al. |
| 2002/0063129 A1 | 5/2002 | Potter et al. |
| 2002/0066737 A1 | 6/2002 | Stack et al. |
| 2002/0067267 A1 | 6/2002 | Kirkham |
| 2002/0081346 A1 | 6/2002 | Ekendahl et al. |
| 2002/0111819 A1 | 8/2002 | Li et al. |
| 2002/0115436 A1 | 8/2002 | Howell et al. |
| 2002/0115438 A1 | 8/2002 | D'Herbemont et al. |
| 2002/0126013 A1 | 9/2002 | Bridgelall |
| 2002/0130817 A1 | 9/2002 | Forster et al. |
| 2002/0138017 A1 | 9/2002 | Bui et al. |
| 2002/0170961 A1 | 11/2002 | Dickson et al. |
| 2002/0175872 A1 | 11/2002 | Apostolos |
| 2002/0190845 A1 | 12/2002 | Moore |
| 2002/0196771 A1 | 12/2002 | Vij et al. |
| 2003/0005316 A1 | 1/2003 | Girard |
| 2003/0017845 A1 | 1/2003 | Doviak et al. |
| 2003/0050032 A1 | 3/2003 | Masaki |
| 2003/0061113 A1 | 3/2003 | Petrovich et al. |
| 2003/0083920 A1 | 5/2003 | Richards et al. |
| 2003/0189490 A1 | 10/2003 | Hogerton et al. |
| 2004/0027289 A1 | 2/2004 | Huang |
| 2004/0046643 A1 | 3/2004 | Becker et al. |
| 2004/0049428 A1 | 3/2004 | Soehnlen et al. |
| 2004/0061324 A1 | 4/2004 | Howard |
| 2004/0067734 A1 | 4/2004 | Gunnarsson |
| 2004/0069851 A1 | 4/2004 | Grunes et al. |
| 2004/0069852 A1 | 4/2004 | Seppinen et al. |
| 2004/0070504 A1 | 4/2004 | Brollier et al. |
| 2004/0074959 A1 | 4/2004 | Foth et al. |
| 2004/0078151 A1 | 4/2004 | Aljadeff et al. |
| 2004/0080299 A1 | 4/2004 | Forster et al. |
| 2004/0082296 A1 | 4/2004 | Twitchell |
| 2004/0083025 A1 | 4/2004 | Yamanouchi et al. |
| 2004/0085191 A1 | 5/2004 | Horwitz et al. |
| 2004/0089408 A1 | 5/2004 | Brod et al. |
| 2004/0089707 A1 | 5/2004 | Cortina et al. |
| 2004/0093116 A1 | 5/2004 | Mountz |
| 2004/0094949 A1 | 5/2004 | Savagian et al. |
| 2004/0102869 A1 | 5/2004 | Andersen et al. |
| 2004/0102870 A1 | 5/2004 | Andersen et al. |
| 2004/0105411 A1 | 6/2004 | Boatwright et al. |
| 2004/0106376 A1 | 6/2004 | Forster |
| 2004/0111335 A1 | 6/2004 | Black et al. |
| 2004/0112967 A1 | 6/2004 | Krappe et al. |
| 2004/0164864 A1 | 8/2004 | Chung et al. |
| 2004/0171373 A1 | 9/2004 | Suda et al. |
| 2004/0174260 A1 | 9/2004 | Wagner |
| 2004/0177012 A1 | 9/2004 | Flanagan |
| 2004/0177032 A1 | 9/2004 | Bradley et al. |
| 2004/0185667 A1 | 9/2004 | Jenson |
| 2004/0185687 A1 | 9/2004 | Liao et al. |
| 2004/0203352 A1 | 10/2004 | Hall et al. |
| 2004/0203355 A1 | 10/2004 | Light et al. |
| 2004/0203377 A1 | 10/2004 | Eaton et al. |
| 2004/0212479 A1 | 10/2004 | Gilbert et al. |
| 2004/0217865 A1 | 11/2004 | Turner |
| 2004/0217867 A1 | 11/2004 | Bridgelall et al. |
| 2004/0219951 A1 | 11/2004 | Holder |
| 2004/0226392 A1 | 11/2004 | McNally |
| 2004/0233789 A1 | 11/2004 | Oguchi et al. |
| 2004/0238623 A1 | 12/2004 | Asp |
| 2004/0238823 A1 | 12/2004 | Lee et al. |
| 2004/0239498 A1 | 12/2004 | Miller |
| 2004/0249538 A1 | 12/2004 | Osaki et al. |
| 2004/0252025 A1 | 12/2004 | Silverbrook et al. |
| 2004/0263319 A1 | 12/2004 | Huomo |
| 2004/0263329 A1 | 12/2004 | Cargonja et al. |

(56) References Cited

U.S. PATENT DOCUMENTS

| | | | |
|---|---|---|---|
| 2005/0004281 A1 | 1/2005 | Adedeji et al. | |
| 2005/0012613 A1 | 1/2005 | Eckstein et al. | |
| 2005/0012616 A1 | 1/2005 | Forster et al. | |
| 2005/0017899 A1 | 1/2005 | Cervinka et al. | |
| 2005/0024200 A1 | 2/2005 | Lambright et al. | |
| 2005/0024269 A1 | 2/2005 | Kotzin et al. | |
| 2005/0024286 A1 | 2/2005 | Fukuda | |
| 2005/0030160 A1 | 2/2005 | Goren et al. | |
| 2005/0040934 A1 | 2/2005 | Shanton | |
| 2005/0043850 A1 | 2/2005 | Stevens et al. | |
| 2005/0052281 A1 | 3/2005 | Bann | |
| 2005/0052283 A1 | 3/2005 | Collins et al. | |
| 2005/0054290 A1 | 3/2005 | Logan et al. | |
| 2005/0060246 A1 | 3/2005 | Lastinger et al. | |
| 2005/0065861 A1 | 3/2005 | Bann | |
| 2005/0065881 A1 | 3/2005 | Li et al. | |
| 2005/0068182 A1 | 3/2005 | Dunlap et al. | |
| 2005/0071234 A1 | 3/2005 | Schon | |
| 2005/0076816 A1 | 4/2005 | Nakano | |
| 2005/0083177 A1 | 4/2005 | Willgert | |
| 2005/0083180 A1 | 4/2005 | Horwitz et al. | |
| 2005/0093701 A1 | 5/2005 | Hollon | |
| 2005/0097010 A1 | 5/2005 | Carrender | |
| 2005/0098620 A1 | 5/2005 | Dunlap | |
| 2005/0099292 A1 | 5/2005 | Sajkowsky | |
| 2005/0103835 A1 | 5/2005 | Kunito et al. | |
| 2005/0104747 A1 | 5/2005 | Silic et al. | |
| 2005/0104796 A1 | 5/2005 | Plettner et al. | |
| 2005/0104798 A1 | 5/2005 | Nolan et al. | |
| 2005/0107092 A1 | 5/2005 | Charych et al. | |
| 2005/0110612 A1 | 5/2005 | Carrender | |
| 2005/0128066 A1 | 6/2005 | Hawkinson | |
| 2005/0128086 A1 | 6/2005 | Brown et al. | |
| 2005/0134461 A1 | 6/2005 | Gelbman et al. | |
| 2005/0140511 A1 | 6/2005 | Bonnell et al. | |
| 2005/0143133 A1 | 6/2005 | Bridgelall | |
| 2005/0156709 A1 | 7/2005 | Gilbert et al. | |
| 2005/0159187 A1 | 7/2005 | Mendolia et al. | |
| 2005/0168325 A1 | 8/2005 | Lievre et al. | |
| 2005/0168385 A1 | 8/2005 | Baker | |
| 2005/0169345 A1 | 8/2005 | Urbas et al. | |
| 2005/0179604 A1 | 8/2005 | Liu et al. | |
| 2005/0181783 A1 | 8/2005 | Foosaner et al. | |
| 2005/0186902 A1 | 8/2005 | Lieffort et al. | |
| 2005/0190098 A1 | 9/2005 | Bridgelall et al. | |
| 2005/0190111 A1 | 9/2005 | King et al. | |
| 2005/0190707 A1 | 9/2005 | Nishizawa et al. | |
| 2005/0192031 A1 | 9/2005 | Vare | |
| 2005/0192727 A1 | 9/2005 | Shostak et al. | |
| 2005/0193222 A1 | 9/2005 | Greene | |
| 2005/0193549 A1 | 9/2005 | Forster et al. | |
| 2005/0194446 A1 | 9/2005 | Wiklof et al. | |
| 2005/0194640 A1 | 9/2005 | Lazarev | |
| 2005/0195768 A1 | 9/2005 | Petite et al. | |
| 2005/0195775 A1 | 9/2005 | Petite et al. | |
| 2005/0196208 A1 | 9/2005 | Lin | |
| 2005/0198208 A1 | 9/2005 | Nystrom | |
| 2005/0198228 A1 | 9/2005 | Bajwa et al. | |
| 2005/0198348 A1 | 9/2005 | Yeates et al. | |
| 2005/0199716 A1 | 9/2005 | Shafer et al. | |
| 2005/0200457 A1 | 9/2005 | Bridgelall et al. | |
| 2005/0205676 A1 | 9/2005 | Saito | |
| 2005/0206503 A1 | 9/2005 | Corrado et al. | |
| 2005/0206520 A1 | 9/2005 | Decker et al. | |
| 2005/0206555 A1 | 9/2005 | Bridgelall et al. | |
| 2005/0206562 A1 | 9/2005 | Willson et al. | |
| 2005/0207381 A1 | 9/2005 | Aljadeff et al. | |
| 2005/0222701 A1 | 10/2005 | Ekberg | |
| 2005/0232747 A1 | 10/2005 | Brackmann et al. | |
| 2005/0237195 A1 | 10/2005 | Urban | |
| 2005/0242959 A1 | 11/2005 | Watanabe | |
| 2006/0011108 A1 | 1/2006 | Abu-Isa et al. | |
| 2006/0043199 A1 | 3/2006 | Baba et al. | |
| 2006/0109106 A1* | 5/2006 | Braun | 340/539.13 |
| 2006/0236903 A1 | 10/2006 | Moore | |
| 2007/0108296 A1 | 5/2007 | Konopka et al. | |
| 2007/0182559 A1 | 8/2007 | Lawrence et al. | |
| 2008/0024309 A1 | 1/2008 | Balhoff et al. | |
| 2008/0246614 A1 | 10/2008 | Paananen | |
| 2009/0201152 A1* | 8/2009 | Karr et al. | 340/545.6 |
| 2009/0289777 A1 | 11/2009 | Goll et al. | |
| 2010/0148940 A1* | 6/2010 | Gelvin et al. | 340/286.02 |
| 2010/0219938 A1* | 9/2010 | Twitchell, Jr. | 340/10.1 |
| 2011/0227725 A1 | 9/2011 | Muirhead | |
| 2011/0253792 A1 | 10/2011 | Tuttle et al. | |
| 2014/0018023 A1 | 1/2014 | Lee et al. | |
| 2014/0210614 A9 | 7/2014 | Muirhead | |

FOREIGN PATENT DOCUMENTS

| | | |
|---|---|---|
| DE | 19526131 A1 | 1/1997 |
| DE | 10024421 A1 | 11/2001 |
| EP | 0025510 A1 | 3/1981 |
| EP | 090507 A1 | 10/1983 |
| EP | 0249203 A1 | 12/1987 |
| EP | 0400640 A1 | 12/1990 |
| EP | 0412020 A1 | 2/1991 |
| EP | 0458722 A1 | 11/1991 |
| EP | 0535919 A2 | 4/1993 |
| EP | 0905057 A1 | 3/1999 |
| EP | 1382533 A2 | 1/2004 |
| EP | 2249522 A1 | 11/2010 |
| FR | 2249522 A7 | 5/1975 |
| FR | 2697801 A1 | 5/1994 |
| JP | 1032851 | 9/1990 |
| JP | 8011885 | 1/1996 |
| JP | 8244773 | 9/1996 |
| JP | 941756 | 2/1997 |
| JP | 9254983 | 9/1997 |
| JP | 10182096 | 9/1998 |
| JP | 10250735 | 11/1998 |
| JP | 10305997 | 1/1999 |
| JP | 11001230 | 1/1999 |
| JP | 2001026309 A | 1/2001 |
| JP | 2001233337 A | 8/2001 |
| JP | 2001278270 A | 10/2001 |
| JP | 2002154618 A | 5/2002 |
| JP | 2002265060 A | 9/2002 |
| JP | 2003095270 A | 4/2003 |
| JP | 2005104498 A | 4/2005 |
| JP | 5085545 B2 | 11/2012 |
| JP | 5155600 B2 | 3/2013 |
| JP | 5262499 B2 | 8/2013 |
| JP | 4173699 B2 | 8/2014 |
| NL | 9401836 A | 6/1996 |
| NL | 9401838 A | 6/1996 |
| WO | WO-9424010 A1 | 10/1994 |
| WO | WO-9821691 A1 | 5/1998 |
| WO | WO-9836929 A1 | 8/1998 |
| WO | WO-9914485 A1 | 3/1999 |
| WO | WO-9944851 A1 | 9/1999 |
| WO | WO-9956977 A1 | 11/1999 |
| WO | WO-9964221 A1 | 12/1999 |
| WO | WO-0043230 A1 | 7/2000 |
| WO | WO-0047437 A1 | 8/2000 |
| WO | WO-0048859 A1 | 8/2000 |
| WO | WO-0064694 A1 | 11/2000 |
| WO | WO-0074965 A1 | 12/2000 |
| WO | WO-0100433 A1 | 1/2001 |
| WO | WO-0236380 A1 | 5/2002 |

OTHER PUBLICATIONS

Automotive Plastics, News & Views, Steel and Plastics Square Off Over Fuel Tanks, pp. 12-14.

Brindley, Chaille, "Going Up in Smoke", Industrial Reporting, Inc., Oct. 1, 2001.

Catastrophic Fire Prevention Task Force, Progress Report on Appropriate Use of Plastic Pallets, undated publication, p. 1-2.

Cheryl German, http:www.kiefeltech.com/march.sub.--10.sub.--2000.sub.--2.htm, KTI Announces New Process for the Manufacture of Fuel Tanks Using Twin Sheet Forming, 2 pages, Mar. 10, 2000.

Electronics Industry Pallet Specification Draft Updated Sep. 6, 2001, p. 8.

(56) References Cited

OTHER PUBLICATIONS

Eliminating Emissions, http:www.visteon.com/news/features/091300.html, 2 pages, Oct. 18, 2000.
English Abstract of Japanese Patent Publication 090041756 (Sep. 11, 1998).
English Abstract of Japanese Patent Publication 10032851 (Feb. 16, 1998).
English language version of the abstract for European Patent Document No. DE4334668 downloaded from www.espacenet. com on Jun. 27, 2006.
English language version of the abstract for European Patent Document No. EP0025510 downloaded from www.espacenet.com on Jun. 27, 2006.
English language version of the abstract for European Patent Document No. EP0412020 downloaded from www.espacenet.com on Jun. 27, 2006.
English language version of the abstract for French Patent Document No. FR2697801 downloaded from www.espacenet.com on Jun. 27, 2006.
English language version of the abstract for German Patent Document No. DE10024421 downloaded from www.espacenet.com on Feb. 2, 2007.
English language version of the abstract for German Patent Document No. DE19526131 downloaded from www.espacenet.com on Jun. 27, 2006.
English language version of the abstract for German Patent Document No. DE4334668 downloaded from www.espacenet.com on Jun. 27, 2006.
English language version of the abstract for German Patent Document No. EP0025510 downloaded from www.espacenet.com on Jun. 27, 2006.
English language version of the abstract for Japanese Patent Document No. JP10182096 downloaded from www.espacenet.com on Jun. 27, 2006.
English language version of the abstract for Japanese Patent Document No. JP10250735 downloaded from www.espacenet.com on Jun. 27, 2006.
English language version of the abstract for Japanese Patent Document No. JP10305997 downloaded from www.espacenet.com on Jun. 27, 2006.
English language version of the abstract for Japanese Patent Document No. JP11001230 downloaded from www.espacenet.com on Jun. 27, 2006.
English language version of the abstract for Japanese Patent Document No. JP2001026309 downloaded from www.espacenet.com on Jun. 27, 2006.
English language version of the abstract for Japanese Patent Document No. JP2001233337 downloaded from www.espacenet.com on Jun. 27, 2006.
English language version of the abstract for Japanese Patent Document No. JP2001278270 downloaded from www.espacenet.com on Jun. 27, 2006.
English language version of the abstract for Japanese Patent Document No. JP2002154618 downloaded from www.espacenet.com on Jun. 27, 2006.
English language version of the abstract for Japanese Patent Document No. JP2002265060 downloaded from www.espacenet.com on Jun. 27, 2006.
English language version of the abstract for Japanese Patent Document No. JP2003095270 downloaded from www.espacenet.com on Jun. 27, 2006.
English language version of the abstract for Japanese Patent Document No. JP2005104498 downloaded from www.espacenet.com on Jun. 27, 2006.
English language version of the abstract for Japanese Patent Document No. JP4173699 downloaded from www.espacenet.com on Jun. 27, 2006.
English language version of the abstract for Japanese Patent Document No. JP5085545 downloaded from www.espacenet.com on Jun. 27, 2006.
English language version of the abstract for Japanese Patent Document No. JP5155600 downloaded from www.espacenet.com on Jun. 27, 2006.
English language version of the abstract for Japanese Patent Document No. JP5262499 downloaded from www.espacenet.com on Jun. 27, 2006.
English language version of the abstract for Japanese Patent Document No. JP8011885 downloaded from www.espacenet.com on Jun. 27, 2006.
English language version of the abstract for Japanese Patent Document No. JP8244773 downloaded from www.espacenet.com on Jun. 27, 2006.
English language version of the abstract for Japanese Patent Document No. JP9254983 downloaded from www.espacenet.com on Jun. 27, 2006.
Extreme.TM. Pallet, General Electric Company Publication brochure GID-PAL-120 2 pages.
FastTrack.TM. Series RFID Tags, Escort Memory Systems, Inc. 1999, Publication No. 17-5128, 6 pages.
Jan H. Schut, http://www.plasticstechnology.com/Scripts/SP-MainPT...backslash.200012fal-.htm, Move Over Blow Molding, 8 pages, Dec. 2000.
Jay Werb & Colin Larel, http://www.pinpointco.com/.sub.--private/whitep Designing a Positioning System for Finding Things and People Indoors, 11 pages, 1988.
Jay Werb & Colin Larel, http://www.pinpointco.com/_private/whitep Designing a Positioning System for Finding Things and People Indoors, 11 pages, 1988.
K Lowenfeld, article entitled "Plate-Stiffening" in Der Maachinemarkt (Wurzburg). 2 pages.
K Lowenfield, "Plate Stiffening", in Der Maschinemarkt (Wurzburg), 2 pages.
Kevin R. Sharp, http://www.idsystems.com/reader/1999.sub.--11/good1199.htm, Good Design Makes RFID Work, 4 pages, Nov. 1999.
Kevin R. Sharp, http://www.idsystems.com/reader/1999_11/good1199.htm, Good Design Makes Rfid Work, 4 pages, Nov. 1999.
Kevin R. Sharp, http://www.idsystems.com/implementer/ articles/deli0299.htm, A Delicate Balance: Multifrequency RF Management, 4 pages, Feb. 1999.
Kevin R. Sharp, http://www.idsystems.com/reader/1999.sub.--03/phys0399.htm, Physical Reality, 4 pages, Mar. 1999.
Kevin R. Sharp, http://www.idsystems.com/reader/1999.sub.--05/join0599.htm, Joint Venture Produces New RFID Chips, 4 pages, May 1999.
Kevin R. Sharp, http://www.idsystems.com/reader/1999.sub.--051 less0599.htm, Lessons from the Front, 5 pages, May 1999.
Kevin R. Sharp, http://www.idsystems.com/reader/1999.sub.--09/rfid0999.htm, RFID: What's it Worth to You?, 4 pages, Sep. 1999.
Kevin R. Sharp, http://www.idsystems.com/reader/1999_03/phys0399.htm, Physical Reality, 4 pages, Mar. 1999.
Kevin R. Sharp, http://www.idsystems.com/reader/1999_05/join0599.htm, Joint Venture Produces New RFID Chips, 4 pages, May 1999.
Kevin R. Sharp, http://www.idsystems.com/reader/1999_05/less0599.htm, Lessons from the Front, 5 pages, May 1999.
Kevin R. Sharp, http://www.idsystems.com/reader/1999_09/rfid0999.htm, RFID: What's It Worth to You?, 4 pages, Sep. 1999.
MicroID.TM. 125 kHz RFID System Design Guide, entire booklet, 1998 Microchip Technology Inc., Dec. 1998.
Modern Plastics, www.modplas.com, News Briefs, Visteon Readies Thermoforming for Fuel Tanks, p. 14, Feb. 2001.
Paul Quinn, http://www.idsystems.com/reader/1999.sub.--05/comm0599/comm09599.htm, Could this be the Start of Something Big!, 2 pages, May 1999.
Paul Quinn, http://www.idsystems.com/reader/1999_05/comm0599/comm09599.htm, Could this be the Start of Something Big!, 2 pages, May 1999.
Paul Quinn, http://www.idsystems.com/reader/2000.sub.--01/high0100/high0100htm, A Highly Pallet-able Solution, 3 pages, Jan. 2000.
Paul Quinn, http://www.idsystems.com/reader/2000_01/high0100/high0100htm, A Highly Pallet-able Solution, 3 pages, Jan. 2000.
Plastics News article, Visteon Corp. To Thermoform Fuel Tanks, Crain Communications Inc., Oct. 16, 2000, 2 pages.

(56) References Cited

OTHER PUBLICATIONS

Rhoda Miel, http:/www.plasticsnews.com/subscriber/ headlines2.phtm, Mannesmann eyes injection molded fuel tank, 2 pages, Mar. 9, 2001.

Rhoda Miel, http:www.plasticsnews.com/subscriber/headlines2.phtm, TI develops way to cap emissions, 2 pages, Dec. 1, 2000.

Tag-it.TM. Inlays Texas Instruments, 2 sheets, 1999.

Witt, Clyde E., "Jumping Through Plastic Hoops of Fire", Material Handling Management, Oct. 2002.

* cited by examiner

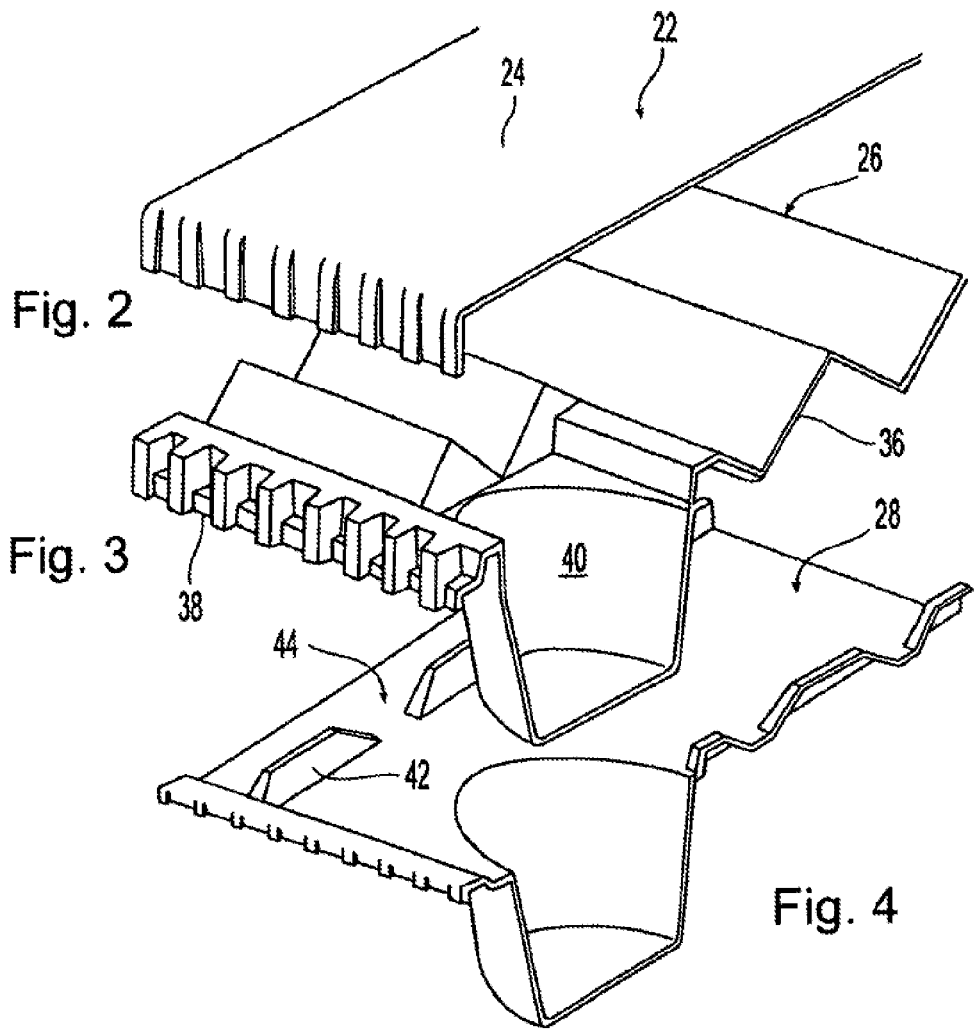
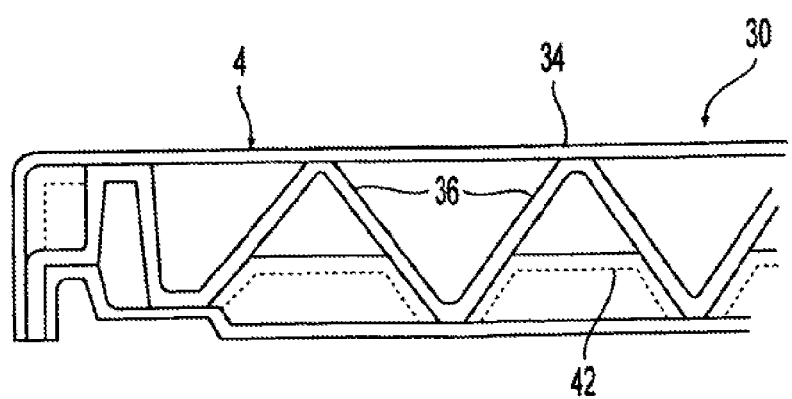

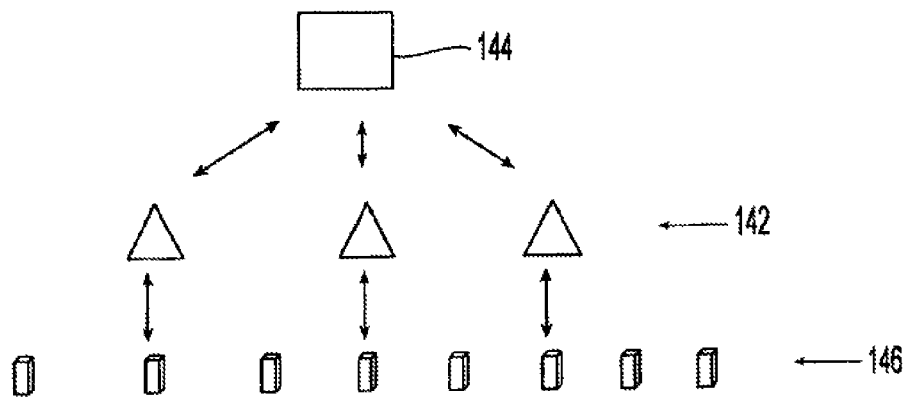
Fig. 10
(Prior Art)
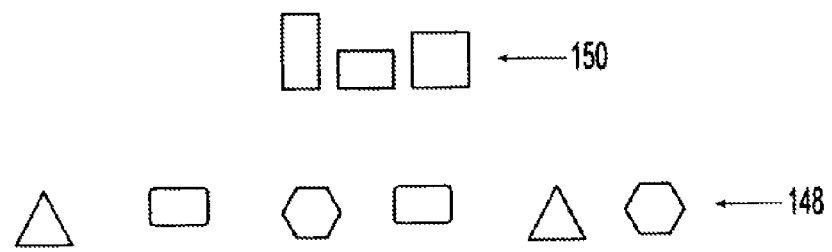
Fig. 11

PALLET

CROSS-REFERENCE TO RELATED APPLICATIONS

This application is a continuation of U.S. patent application Ser. No. 13/506,846 filed on May 21, 2012, which is a continuation of U.S. patent application Ser. No. 13/068,943 filed on May 25, 2011, which is a continuation-in-part of U.S. patent application Ser. No. 11/981,091 filed on Oct. 31, 2007, now U.S. Pat. No. 8,077,040, which is a continuation of U.S. patent application Ser. No. 11/152,628 filed on Jun. 14, 2005, now U.S. Pat. No. 7,342,496, which is a continuation-in-part of U.S. patent application Ser. No. 09/770,097 filed on Jan. 24, 2001, now U.S. Pat. No. 6,943,678, which claims the benefit of U.S. Provisional Patent Application No. 60/177,383, filed on Jan. 24, 2000. The disclosures of each of the above applications are incorporated herein by reference.

FIELD

The present disclosure relates to plastic pallets and in particular to plastic pallets developed to operate within radio frequency rich environments.

BACKGROUND

This section provides background information related to the present disclosure which is not necessarily prior art.

Pallets are used to move products through supply chains and to store products between movements. Wood has been the preferred material of pallet construction. A number of standard pallet sizes, such as the Grocery Manufacturers Association ("GMA") style 48×40 inch pallet, have been used to facilitate the wide spread use of wooden pallets across differing distribution networks with some success. Such pallets are utilized in great numbers in what is known in industry as "pallet exchange". It is estimated that there are 2.2 billion wood pallets in North America.

Wooden pallets have problems. In particular, wooden pallets deteriorate with use and cause problems that add user costs. Fortune 500 companies that utilize large numbers of wooden pallets seek to overcome problems associated with deteriorating pallets by hiring wooden pallets from pallet rental companies. Pallet rental companies maintain large pools of wooden pallets and repair damaged wooden pallets before they are re-used. Large users of wooden pallets have therefore been able to manage their costs by transferring the burdens associated with wooden pallet deterioration and pallet exchange to other supply chain service companies.

Although the business model used by pallet rental companies has enjoyed some success, there have been problems. For example, it is difficult to keep track of wooden pallets after they are let for hire. Chep International, the largest pallet pooling company, reportedly lost 14 million wooden pallets, and booked a $238 million adjustment in its financial reporting. These pallet tracking and other inherent wooden pallet problems have increased the need to modify business models relating to the use of pallets for rental purposes.

For example, there are several business conditions and economic factors combined with a convergence of technologies that have led to the creation of track and trace technologies exemplified by the term RFID (radio frequency identification). RFID holds the promise of providing real time supply chain visibility so that in the first instance pallet rental companies would be able to track their rental assets and in the second instance so that pallet users could trace their product through the supply chain.

Implementation of RFID, in one respect, involves the attachment of a tag, which contains a unique identification code, onto a pallet and a distributed network of tag readers. The tag readers associate a tag with a known location to determine the status or progress of the pallet within the supply chain. In this manner, the pallet can be tracked and traced with some accuracy, and the status of the pallet can be queried and displayed according to well understood principles by industry.

Implementation of any RFID system is problematic with regard to wooden pallets. For instance, in U.S. Pat. No. 7,271,726, which is assigned to Chep International, it is suggested that a tag can be positioned exteriorly upon a nine block GMA style 48×40 inch wooden pallet. Thus, as each tag is read its location would be known. There are however several problems with such an arrangement. In the first instance, it is known that wood absorbs liquid and liquids interfere with radio frequency signals. Therefore, the reliability of communication between the reader and the tag could be compromised by the wooden materials utilized in the construction of the pallet. In a second instance, a tag that is exteriorly positioned upon a surface of a wooden pallet would be subject to a high level of the wear and tear. The impact of a fork tine against an exteriorly positioned tag could result in the destruction of the tag and the loss of the data stored in the memory of the tag. In the final analysis, wood is not a suitable material for constructing pallets that must work within radio frequency rich environments.

As a result of some of the aforementioned circumstances and problems industry has attempted to utilize plastic materials in the construction of pallets. The replacement of wood with plastic has had some success but there have been problems associated with the use of plastic pallets that are to be used in association with track and trace technologies including RFID.

An early example of a plastic pallet that employees a data collection device (i.e. a tag) to provide a track and trace capability is described in U.S. Pat. No. 5,971,592 to Kralj et al. In this cited reference the data collection devices are contained in cavities located on each side of the four corners of the pallet. The apparent need for a tag in each corner is due to the short interrogation range of the readers of the day. In this arrangement a plurality of tags are required which would be more costly than an arrangement in which only one tag is required.

Similarly, in U.S. Pat. No. 6,199,488 to Favaron et al., a plastic pallet with two RFID cards (i.e. tags) is shown and described. The cards are positioned at angles and in the opposite corners so that at least one card is in communication range with a detector (i.e. a reader) from a side position (i.e. from a portal column or fork lift mounted reader). Although the Favaron et al. arrangement utilizes fewer tags than the Kralj et al. arrangement, Favaron et al. nevertheless utilizes more than one tag which is less economical than the use of one tag. A similar arrangement, requiring two or more tags, is disclosed in more thorough detail in U.S. Pat. No. 6,669,089, which was filed Nov. 12, 2001, and is assigned to 3M Innovative Properties Company.

Presumably, the arrangements suggested by Kralj et al. would be more reliable than the arrangement of application '745 because the devices of Kralj et al. are enclosed within the structures forming the pallet and therefore are less susceptible than exteriorly mounted tags to damage from fork impacts, wear and tear and the like. Furthermore, Kralj et al. would be more reliable than Favaron et al. because although Favaron et al. contemplates the containment of the tag within the body of the pallet, the Favaron et al. arrangement could allow liquids and other debris to penetrate into and accumulate within a socket wherein the tag of Favaron et al. is located. Liquids and debris within the socket could damage the tag or result in unreliable communication between the tag and the reader.

In U.S. Pat. No. 6,483,434, which is assigned to IFCO Systems, another pallet rental company, it is suggested that the delicate components of a transponder (i.e. a tag) can be protectively housed inside a plastic casing. The casing containing the delicate transponder could be subsequently positioned inside an injection mold and incorporated safely into an injection molded component forming part of a plastic pallet. This arrangement would protect the tags and overcome the problem associated with Favaron et al, wherein the tags are indirectly exposed to wear and tear.

Although the arrangements encasing the RFID tags within the plastic pallet embodiments cited above offer levels of protection superior to the method of application '745, such arrangements nevertheless have additional problems. In particular, in order to remove, replace or repair the tags of the prior art references, the plastic pallets themselves would have to be deconstructed or destroyed to provide access to the tags. Accordingly, the prior art does not contemplate an efficient means to either replace defective or damaged tags or to upgrade long lasting plastic pallets with new tags incorporating enhanced capabilities as these become available. It should be noted that a plastic pallet can have a life span of +/−ten years, which length of time may easily exceed the lifecycle of a deployed RFID technology.

In U.S. Pat. No. 6,814,287 to Chang et al. a pallet apparatus equipped with a radio frequency recognition module is described. In a first wooden pallet embodiment the module comprises a molded cup forming a compartment that receives a tag. The cup is covered by a cap to enclose the tag inside the compartment. The module is inserted into a cavity formed in a block or stringer of the wooden pallet. In a second plastic pallet embodiment, the module comprises a removable clip for holding a tag and the clip attaches to the exterior of the plastic pallet. Both embodiments provide an efficient means for accessing a tag without deconstructing or destructing the pallet itself. However, in both cases the module could become detached from the associated pallet resulting in the loss of data and possibly the pallet.

In the above cited references two or more tags are suggested so that information can be obtained from at least one tag. However, in order to write information into the two or more tags, the tags would have to be synchronized with one another. This adds complexity to the implementation of RFID methods and systems. When only a single tag is attached to one side of a pallet, the pallet itself could become an obstacle. In this case the pallet would need to be rotated so that the pallet side with the tag faces the reader. Rotating the pallet is time consuming.

Accordingly, it has been suggested that a tag can be positioned substantially in the center region of the pallet. For example, publication document Netherlands 9401836 proposes locating a tag in the center of a pallet and mounting readers on the tines of a fork lift to enable the reader to communicate with the tag. This arrangement is not amenable to reading the tag from the side through a portal mounted reader. For example, the metal tines could block signals intended for the tag. In U.S. patent application Ser. No. 10/962,574 (U.S. Pub. No. 2005/0076816), a preferred embodiment involves forming a through hole penetrating from one to the other side of the pallet, and positioning a tag inside the through hole in the vicinity of the middle of the pallet. The through hole is characterized as a transmission pathway for radio frequencies traveling between the tag and the reader. One problem with application Ser. No. 10/962,574 is that the through hole could collect debris that could impair the operability of the tag.

As discussed above, the life cycle of a plastic pallet may exceed the useful life cycle of a tag technology. Therefore, it would be advantageous in the adaptation of the plastic pallet to anticipate replacement of earlier tags with technologically up-dated tags. In U.S. Pat. No. 6,844,857, assigned to Linpac Moulding, it has been suggested that a recess, provided with a cover, could be developed to enable the removal and exchange of a circuit (i.e. tag IC) to program the circuit with current data or to exchange the circuit in the case of damage or malfunction or to update tag technology. Although the arrangement does not contemplate the destruction of the plastic pallet to access the tag IC, the recess of U.S. Pat. No. 6,844,857 is not developed to accommodate more than one tag IC at a time. This is a problem because there is a need to provide pallets with a plurality of tags so that the pallet can function across non-interoperable RFID systems existing within the supply chain.

In U.S. Pat. No. 6,816,076, assigned to Allibert Equipment, the advantage of providing a plastic pallet with a tag holder (i.e. a recess) is offered. The tag holder is an open design and provides an easy way to change a tag. The carrier (i.e. pallet) disclosed in U.S. Pat. No. 6,816,076 also contemplates the use of first and second tags involving a relay relationship, in which the antenna of the second tag is operable to increase the read range of the first tag. Such an arrangement is impractical because the first tag incorporated into the plastic pallet that contains the unique pallet ID becomes redundant once the unique ID of the first tag is associated with the unique ID of the second tag.

What is needed is a plastic pallet that is adapted to operate in a radio frequency rich environment. In particular, the pallet must be able to protect RF devices from wear and tear. Where practical, only one tag indicative of a first characteristic should be required, not two tags as is known in the art. The pallet must also provide access to the devices for any number of purposes as would be anticipated in the art.

SUMMARY

This section provides a general summary of the disclosure, and is not a comprehensive disclosure of its full scope or all of its features.

In accordance with the present invention a pallet is provided that is amenable to operating in an RF-rich environment. Towards this end the materials utilized to construct the pallet comprise materials that are substantially transparent to RF signals so that RF signals may pass through the materials utilized to construct the pallet.

It is another object to provide a pallet product with multiple unique identification codes so that a plurality of components each with individual IDs can be combined to form a single product having its own unique product ID. This aspect allows a variety of parties to enjoy multiple levels of product identification.

It is another object to provide the pallet with at least one compartment to accommodate identification devices therein. According to this aspect, in one embodiment, the compartment is created as part of the pallet structure and is located in a position that enables the compartment to occupy a large space to accommodate at least one large identification device.

It is another object to provide an identification device that takes advantage of the large size of the compartment of the pallet. Toward this end the identification device is formed to reside in three planes within the compartment to communicate with external RF apparatus positioned adjacent said pallet. In another aspect the multi-planar device is also multi-modal such that the device operates electromagnetically and electrostatically. In another aspect the multi-planar device is multi-band such that the device operates at different frequency bands used within the supply chain.

It is another object to provide a pallet that accommodates identification apparatus that omits a distributed network of reader devices to facilitate communication between a pallet ID device and a remote host. Toward this end a pallet includes an apparatus populated with at least one of a cellular communications module, a GPS communications module, a Bluetooth communications module, a LAN communications module, a PCS communications module, an interrogation module or any other wireless communications means module as may be anticipated looking forward into the future wherein apparatus is provided to enable close range (up to 10 yards), intermediate range (up to 300 yards) and long range (to several miles) air interface communications without relying upon cable or wire connections. In still further connection with this aspect, a pallet is provided that couples said wireless communication devices, including RFID tags and the like, with sensors to monitor conditions indicative of at least one particular external environmental factor.

It is another object to provide a pallet that includes an RFID reader/writer interrogator for reading and writing to external RFID beacon tags, internal RFID pallet tags and RFID item tags carried by the pallet. The RFID reader/writer interrogator is integrated with one or more communications modules for communicating out of RFID range with pallet management entities. The RFID reader/writer interrogator includes an antenna arrangement having a signal pattern directed to a transporting and storage area for containing the articles with attached RFID item tags to maintain a real-time manifest of pallet inventory. The pallet's RFID reader/writer interrogator is configured to be responsive to the addition and removal of articles with attached RFID item tags upon the load-bearing surface of the pallet. The RFID reader/writer interrogator is additionally communicatively coupled to RFID pallet tags for the purpose of obtaining RFID pallet tag data to which the system is responsive. The RFID reader/writer interrogator includes further antenna arrays for communicative coupling with RFID beacon tags positioned along the distribution path of the pallet. RFID beacon tag data obtained by the pallet's RFID reader/writer interrogator is aggregated with the data obtained from the RFID item tags and RFID pallet tags and packaged for communication via the one or more communications modules to the pallet management entities.

It is another object to provide the pallet with a power resource for autonomous operation. Towards this end a power supply is used to provide power to the components of the pallet apparatus. The power supply can include a battery, a rechargeable battery, and a renewable power supply that optionally rectifies voltage generated by antenna coils into stored energy or an electro-mechanical device that develops storable energy when the pallet is agitated by movement. The power supply is a power resource for active RFID pallet tags, the RFID reader/writer interrogator and the communications modules of the pallet apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a GMA style 48×40 inch pallet including a compartment in the deck structure.

FIGS. 2, 3, and 4 represent an exploded sectional view of deck structure of the pallet indicated at the position 20 of FIG. 1.

FIG. 5 is a side elevation view of the deck structure of the pallet showing the three sheets of a preferred embodiment.

FIG. 10 is a diagram illustrating the prior art of a basic RFID system.

FIG. 11 is a diagram illustrating the complexity of overlapping non-interoperable basic RFID systems.

Corresponding reference numerals indicate corresponding parts throughout the several views of the drawings.

DETAILED DESCRIPTION

Figure 1:
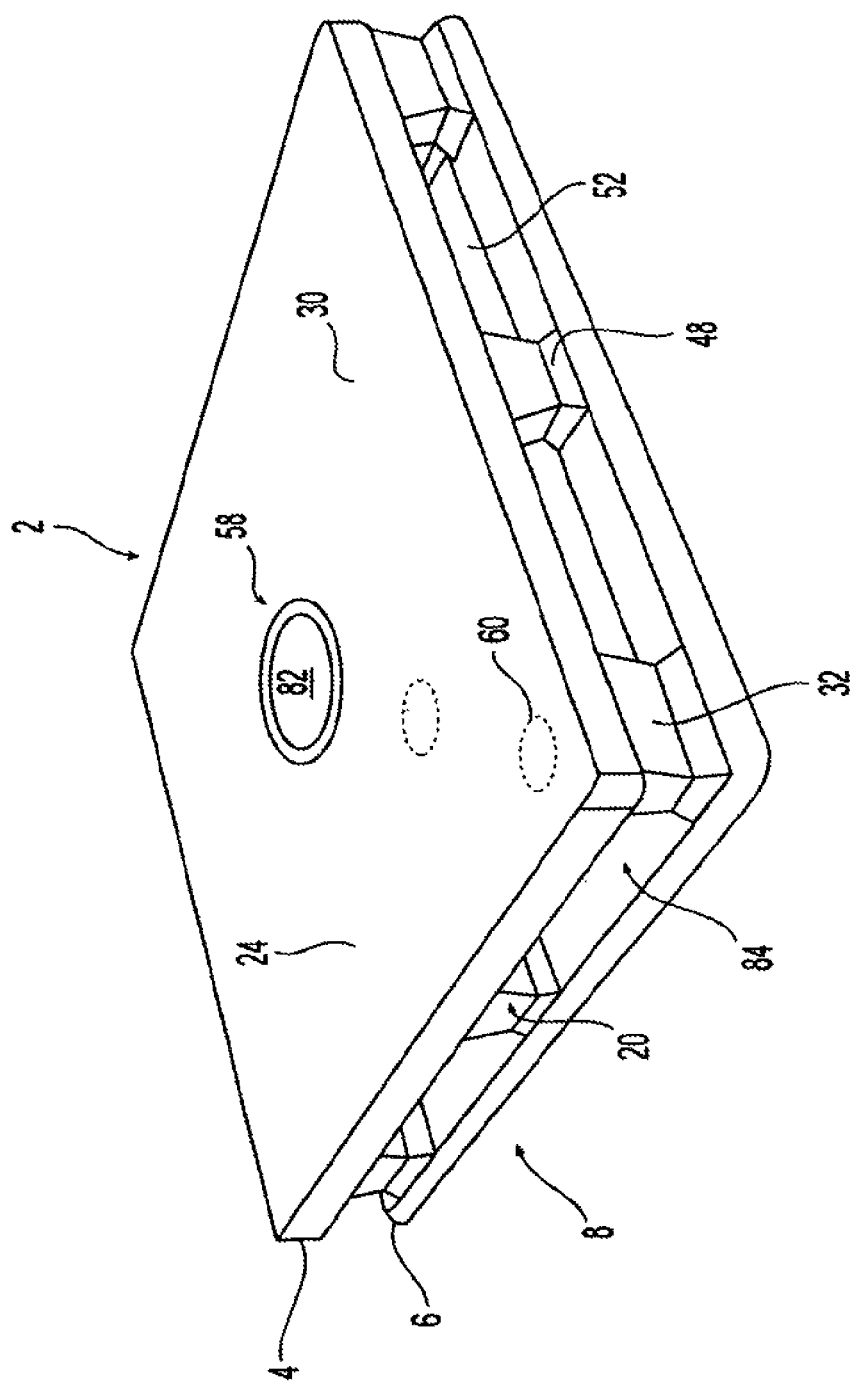

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present embodiments of pallet structures are merely representative of the principles of the invention and are not intended to limit the scope of the invention or application and uses of the invention. Furthermore, there is no intention to be bound by any expressed or implied theory presented in the preceding technical filed, background, or brief summary of the following detailed description. For example, the pallet structures can be made of any plastic, wood, metal, cellulose material or combination thereof. The pallet structures may be injection molded, blow molded, compression molded, differential pressure formed, stamped, die-cut, fabricated and assembled, welded, and bonded together. The pallets can take the form of GMA style 48×40 inch pallets, nine-legged nestable pallets, shipping trays, returnable dunnage and the like. Other products falling within the scope of the invention include IBCs, RPCs, ULDs, fuel tanks and the like.

One preferred embodiment involves exemplary pallet structure 2 comprising a combination of plastic forming techniques as will be described below. Further, the present exemplary pallet structure is in the form of a GMA style 48×40 inch pallet. By way of description the GMA style pallet has the specifications listed below:

1. Exact 48-inch×40-inch dimensions. Square in each direction.
2. True four-way entry. Capable of accommodating existing pallet jacks from all four sides (as opposed to current style with cutouts and stringers).
3. Minimum-width pallet jack openings of 12 inches and minimum height of 3¾ inch clearance when under load. Width of each center support must be less than six inches to accommodate pallet jacks.
4. Smooth, non-skid, top-bearing surface should have at least 85% coverage. However, 100% is preferred. Non-skid surface should be flat, or have no indentations or protrusions that could cause product damage.
5. Bottom-bearing surface of no less than 60% coverage with properly placed cut-outs (12-inches square) for pallet jack wheels from four sides. Surface should be flat or have no indentations or protrusions that could cause product damage.
6. All bottom entry edges should be chamfered to ¼-inch for easy entry and exit.
7. Overall height of platform should not exceed six inches.
8. Rackable from both the 48-inch and 40-inch dimensions. Allowable deflection in drive-in and drive through racks no more than ½ inch.
9. Compatible with pallet conveyors, pallet dispensers, skate-wheel pallet-flow racks, and automatic storage and retrieval systems.
10. No protruding fasteners.
11. Must be made of material that does not contaminate the product it carries.
12. Must meet or exceed current pallet resistance to fire.
13. Must be recyclable. Preferably made of recycled material.
14. Desired weight under 50 pounds.
15. Load capacities of 2,800 pounds. Capable of bearing 2,800-pound loads safely in stacks five loads high.
16. Repairs should be economically feasible.
17. Weather resistant.
18. Moisture resistant.
19. Capable of safely moving product, damage free, through the entire distribution channel with multiple cycles (from manufacturer through distributor to retail).

The exemplary pallet structure of the invention comprises two parts including a deck 4 and a base 6. Together the deck and the base form the GMA style pallet 8. The pallet structure 2 contains at least one identification device 10, for example a radio frequency identification device (RFID) 12 or a surface acoustic wave (SAW) device 14, although the one identification device may be any one of a tag, a capsule, a label, a printed circuit board (PCB), and the like that communicates wirelessly without limitation by employing antennas instead of cables. Preferably a first device 16 identifies the deck and a second device 18 identifies the base. Preferably each part (i.e. the deck and base) is given a unique identification, and this ID record is indicated by the two respective identification devices 16 and 18. The parts are combined to create one product 8. The one product is also given a unique identification distinct from the IDs of the associated parts. Therefore, the pallet 2 has a plurality of IDs, and in the present case three: a first ID for the deck, a second ID for the base and a third ID for the combination product.

The IDs of the exemplary pallet are characterized as first level IDs, second level IDs, third level IDs and so on. In the present case the two part IDs are level one IDs, and the one combination product ID is a level two ID. By way of example, a pallet, with ID number 1006, is associated with the combination of deck, with ID number 101, and base, with ID number 203. Unique pallet ID number 1006 expires when the association of ID numbers 101 and 203 ends. The association ends for example when the deck is reconfigured with a new base, providing a new (up-graded or customized) product. A new unique second level ID is given to the new combination product when the new association is made.

Preferably, both the first and second level IDs are evident in each identification device utilized in each part. In other words, each identification device contains code space for at least two IDs. However, when a product involves only one part the device can have a non-volatile memory or record, therefore getting by with only one unique ID. Such a case is only exemplary.

A pallet may also require a unique third level ID as discussed below. In one scenario the pallet is made by a first company and sold to a second company. The second company utilizes the pallet for internal use i.e. closed-loop purposes. The first company (i.e. the manufacturer) will have a permanent record of a production date, performance specification and material content in the unique first and second level IDs of the parts and product, respectively, sold to the second company. The second company (i.e. the end user) will know at least the second level ID for warranty purposes and the like should the second company return the pallet to the first company for recycling and the like. The second company will also have a dynamic record of the status associated with at least the second level ID or another third level ID if the second level ID is not interoperable within the end user's operating environment (in other words the end user may place another ID device inside the pallet, the second device operating in another mode or frequency band than the first). Therefore, the second company may use a third level ID to associate the pallet within its deployed track and trace system. In a second scenario the manufacturer sells the known parts and product to a second party that leases the product to third parties. A third party may require a unique third or fourth level ID to indicate a customized characteristic indicative of the product. For example, a third party may monitor external temperature to know the shipping status of a unit load. The information indicative of temperature is associated with a unique third or fourth level ID that is distinct from the first and second level IDs associated with the parts and pallet product. Hence, a pallet product may have a plurality of unique IDs.

Therefore, one now appreciates that a pallet must be configured to comply with the GMA performance specifications while at the same time interoperating within a variety of RF-rich environments.

For this purpose the exemplary pallet of FIG. 1 is suggested. Pallet 2 is known as a GMA style 48×40 inch pallet 8 and complies with all 19 GMA performance specifications listed above. Pallet 2 comprises a deck part 4 and a base part 6. The deck and base snap together to provide a single pallet product 8.

Although the deck and base can be constructed utilizing any combination of materials and formed using any forming technique, the preferred structure is primarily based upon differential pressure forming, which is sometimes known as thermoforming or vacuum forming. In the present case, the deck and base are thermoformed according to the triple sheet method, but twin sheet forming can be used with satisfaction. Both thermoforming arts are known in the patent record.

Triple sheet is preferred over twin sheet for several reasons, which would be known by referring to co-owned U.S. Pat. Nos. 6,749,418 and 6,718,888. Referring now to FIGS. 2, 3 and 4, a section 20 of deck is seen comprising three sheets of molded plastic. A top sheet 22 provides a flat surface 24 to provide up to 100 percent surface coverage for supporting unit loads thereon (not shown). A middle sheet 26 and a bottom sheet 28 together provide a load bearing platform 30 and a plurality of double walled leg pockets 32 that support the platform above the base, to allow for the introduction of fork tines, pallet jacks and the like, which are used to move the pallet. The leg pockets 32 may be rectangular, square, round or oval in shape. The structure of a triple sheet configuration results in a hybrid honeycomb arrangement that yields a stronger strength to weight ratio than a twin sheet structure using an equivalent measure of plastic material. Furthermore, the method is preferred because sheet 22 provides a flat load support surface 34 while the two other sheets 26 and 28 form a rigid platform 30 and double walled leg pockets 32 (a twin sheet structure would have less than 100 percent surface coverage if the top sheet was deformed to provide double walled legs and therefore could not comply with specifications 4 and 15 simultaneously). Double walled legs support a higher static load than a single walled leg using the same measure of plastic. A higher strength to weight ratio is preferred for familiar economic reasons.

The present embodiment of triple sheet deck is preferred because the added strength of the structure allows the thermoforming practitioner to utilize an all plastic material combination rather than two sheets of plastic plus captive crossmembers that would be required to add strength to comply with specification 8 for rack strength. All plastic is preferred because some materials used to construct the cross members may block or interfere with the transmission of RF signals. The cross members also add cost and complexity to the making, maintenance and recycling of the pallet structure.

Figure 6:
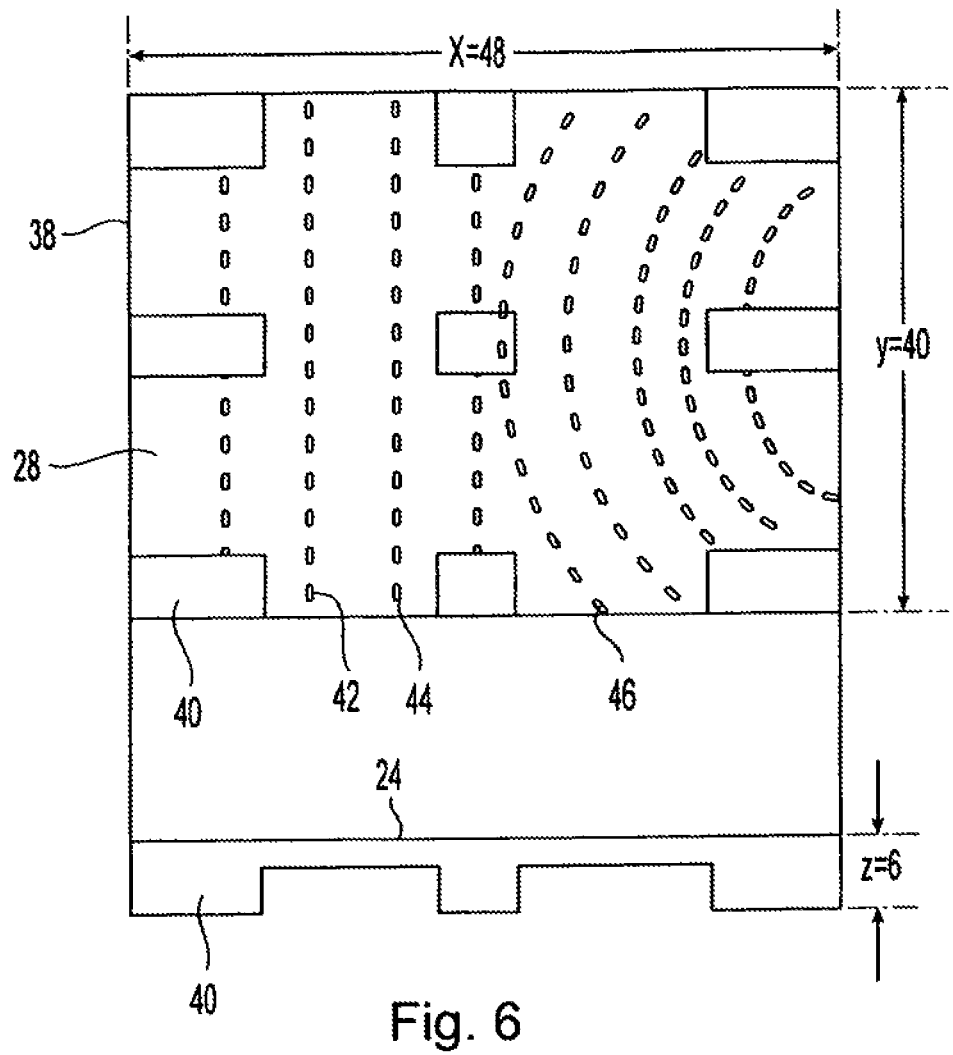
FIG. 6 is a plan view showing the underside of the deck structure and a side elevation view showing the deck structure from the 48-inch side of a pallet.

In the present exemplary case the middle sheet incorporates a series of angles 36 arranged in the 48 inch direction of the 48×40 inch deck, although the angles can be arranged in the 40 inch direction with satisfaction. The angles extend between and fuse to the top sheet and the bottom sheet in a repeating manner between the opposed sides 38a and 38b that are 40 inches apart, and thus maintain the top sheet and the bottom sheet a fixed distance apart (+/−1.5 inches). There may be as many as 80 angles or as few as 20 angles extending from side to side in a 48×40 inch pallet foot print. The angles are interrupted in nine locations 40 designated for leg pockets, although any number of leg pockets or parallel runners falls within the scope of the invention. The bottom sheet incorporates a series of rigidifying blocks 42 that are positioned in line 44 to restrict the angles from bending, like an accordion, when the structure is loaded. The blocks may be short or tall, extending less than or the full height of the angles. The blocks are further aligned as suggested in FIG. 6, so that the blocks create an in-line ribbed structure 46 adding additional reinforcement substantially perpendicular to the stronger 48 inch direction (i.e. in the 40 inch direction).

Although angles 36 are preferred, any rigidifying methodology may be used with satisfaction. The angles are preferred because they are shown to provide the best strength characteristics, as would be known by referring to an article entitled "Plate-Stiffening" written by K. Lowenfeld, published in Der Maschinenmarkt (Wurzburg, Germany), which is incorporated hereunder by such reference.

The base is also constructed according to the triple sheet method, although twin sheet can be used satisfactorily. The base is joined to the deck at a leg interface 48 by a snap fit arrangement 50. The base includes 4 square cutouts 52 that are intended to accommodate the wheels of a pallet jack or the like, which move the pallet.

Figure 7:
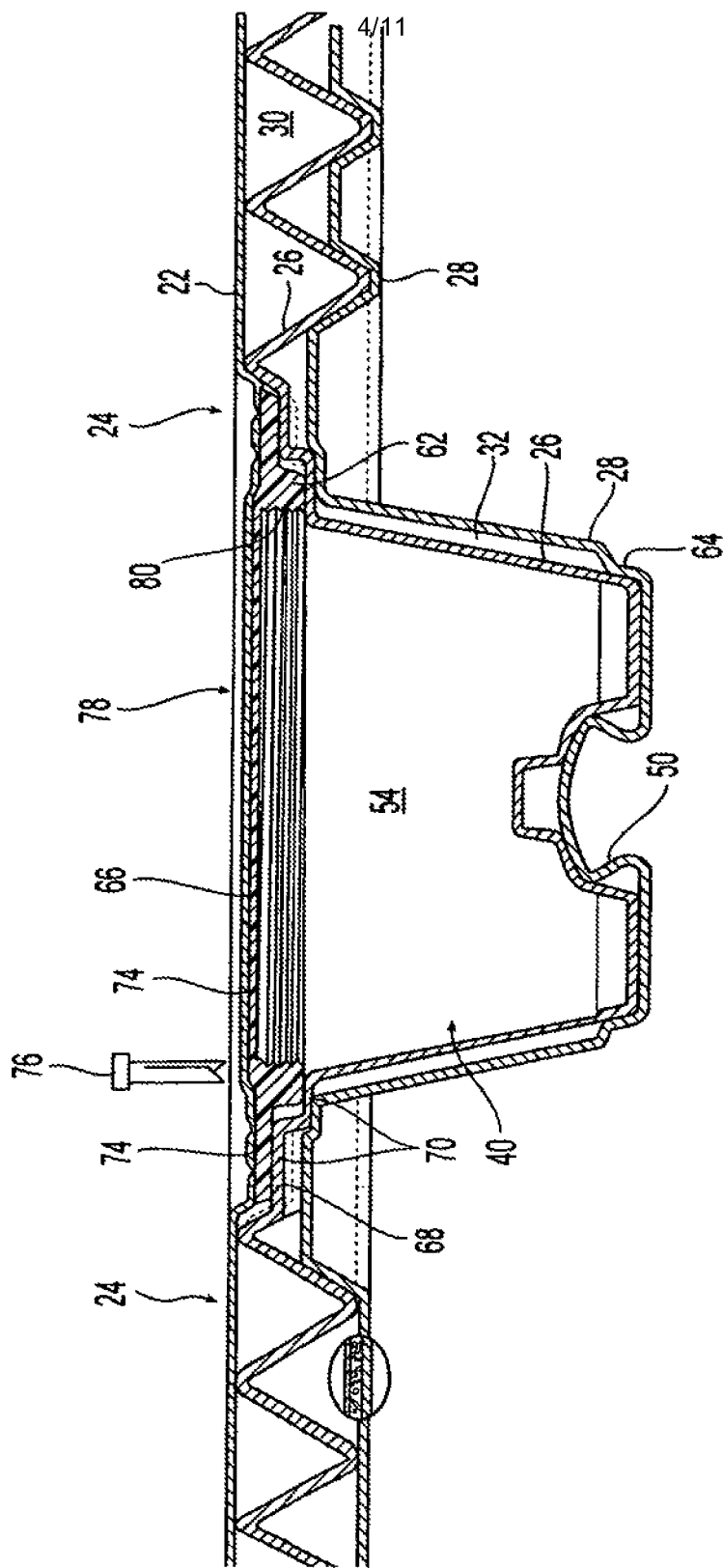
FIG. 7 is a side elevation section of the deck taken from the center region of the pallet.
Figure 8:
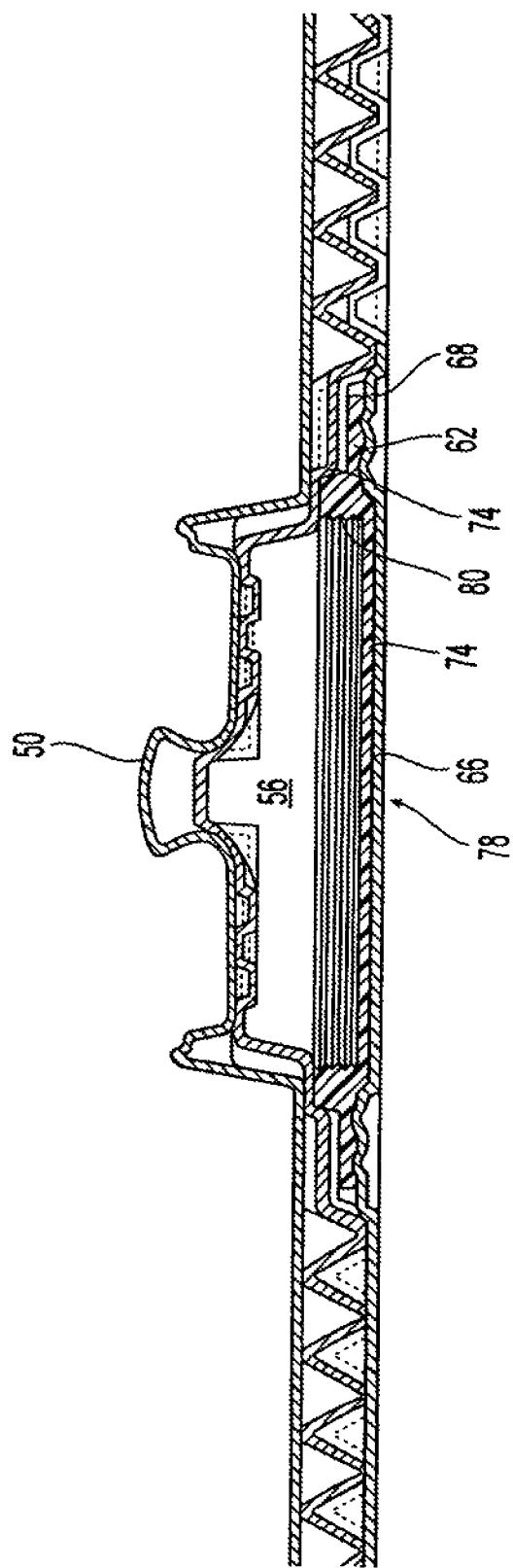
FIG. 8 is a side elevation section of the base of the pallet of FIG. 1 taken from the center region of the pallet.

As indicated in FIGS. 7 and 8 the deck and base of the exemplary GMA style pallet is adapted for operation in an RF-rich environment. In particular, the deck and base incorporate compartments 54 and 56 respectively, and the compartments are adapted to receive and enclosed electronic devices as will be described later.

With respect to compartments 54 and 56, it will be appreciated that the compartments are situated in the location of the center region 58 of the pallet structures, although one or more compartments may be formed in another location 60 corresponding to any one of the nine legs (i.e. in any deep structures) of the exemplary pallet. Additionally, compartments may be formed in locations between the leg pockets, depending upon the preferences of the practitioner. For example, if the pallet embodiment is a nesting style pallet in which case the legs inter-nest for consolidated shipment and storage, the compartment can be incorporated on a top or bottom surface of such a pallet embodiment.

It will also be understood by those familiar with the art of thermoforming that the threaded aspects 62 of the compartments can only be provided through novel intervention as will be described in reference to an exemplary triple sheet molding methodology. With respect to the deck, it should be known that the preferred thermoforming arrangement is one in which the bottom sheet 28 is first formed over a first mold (and the second mold is used as a plug-assist to help form the exterior leg structure 64 of the deep leg pocket having an approximate +/−4:1 draw ratio). Next the middle sheet 26 is formed over a second mold having deep leg pocket portions (not shown) in order to allow the cantenary effect of the heated sheet 26 to benefit the forming thereof. After the first and second sheets are thermoformed they are brought together in a twin sheet phase and compressed together by opposed platens between the first and second molds to make a twin sheet sub-assembly (not shown). The twin sheet sub assembly is extracted from the sheet line when a lower platen carrying the first mold is lowered to make way for the third sheet that is thermoformed over a third mold suspended from a top platen in a position parallel and vertically aligned with the first platen. When the twin sheet sub assembly is in the extracted position a shuttle apparatus known in the art delivers an injection molded insert 66 to a selected location 68 and deposits the insert onto the middle sheet, where formed details 70 of the middle sheet retain the insert in a fixed location upon the twin sheet subassembly. (The insert is not limited in size in the 48 or 40 inch directions.) After the third sheet is thermoformed over the third mold the first platen extends upward into the sheet line where after the twin sheet sub-assembly is compressed against the third sheet between the first and third molds to form an instant triple sheet assembly 72. During the "triple sheet" phase the heated third sheet and heated second sheet are caused to fuse to the exterior surfaces 74 of the insert. The insert is thereby incorporated into the triple sheet assembly. After the triple sheet assembly is extracted from the thermoforming machine a trimming router or the like removes a section 76 of material of the third sheet to provide a compartment opening 78, thereby exposing threads 80 formed in the insert, which threads are adapted to receive a cover 82 as will be described later.

It should be noted that the exemplary insert can be incorporated into a triple sheet, twin sheet or single sheet article. Furthermore, the exemplary insert can be incorporated interiorly (as shown) or exteriorly, depending upon the preference of the practitioner. The insert can involve threads positioned annularly on an inside (as shown) or outside surface, and the threads can be substituted with any structure that will receive and retain with security a removable cover in place to enclose the compartment.

In the present exemplary pallet the compartment is formed in the center region of the pallet so that identification and other electronic devices situated within a respective compartment thereof are substantially equidistant from a device reader positioned adjacent the pallet, for example a hand held, portal or fork lift mounted reader. Furthermore, the compartment is formed in the center region of the exemplary pallet because the deep leg pocket structure of the pallet affords more space for the compartment than would be the case if the compartment where located in a position between the leg pockets. GMA specifications call for a deck 4 thickness of 1.5 inches, a base thickness of 0.75 inches and an overall pallet height of 6 inches. This provides a fork lift opening 84 between the deck and base of 3.75 inches, allowing a maximum 0.250 inch for deflection to remain within GMA tolerance. Therefore, the deck and base structures of a GMA type pallet do not have the thickness to allow for a deep compartment. By developing a compartment in the legs of a pallet the compartment can be considerably larger allowing for the use of larger identification devices and even a plurality of devices, as will be described later.

Therefore the leg pockets are utilized to increase the size capacity of the compartment. In the present embodiment, the depth of the compartments 54 and 56 of the deck and base are 4 inches and 1.5 inches, respectively. A compartment formed otherwise in the platform section of the deck would be +/−1.25 inches in depth, and a compartment formed in the base would be +/−0.5 inches, while allowing for the thickness of the pallet material.

It is advantageous to provide a large compartment because there is a need to accommodate at least one large ID device plus other devices and sensors as will be described below.

Tags communicate with a reader through an antenna. Tags exist in all forms, shapes and sizes. A number of factors determines the form, shape and size of the antenna, whether it is a small (postage stamp) planar antenna, a small capsule or cylindrical antenna, a label antenna of any type, a printed circuit board, a formed (helical, notched) aerial antenna and the like, as well as passive, active or active/passive antenna. Any combination and variety of antenna, whether deposited on a carrier or formed from a conductor can be accommodated within the compartment. The antennas can also be orientated vertically, horizontally, or diagonally with respect to the reader's signal pattern, broadly interpreted.

Therefore, the compartment should be as large as possible to accommodate a wide range of antenna in a number of different orientations suitable for tag to reader data exchange.

For example, Ultra High Frequency (UHF) (e.g., 915 MHz, 2.45 GHz) electromagnetic tags are preferred in association with pallets because of their relatively long range abilities. Lower frequency (e.g., 125 kHz, 13.56 MHz) electrostatic tags are preferred for close range inventory or shelving applications requiring good signal carrier reflection. However, all frequency bands and modes of operation (i.e. electromagnetic, electrostatic, acoustic) are intended to be used by any possible identification device that may be located in the compartment in order to monitor the pallet and its unit load through all stages of the disparate supply chain.

Lower frequency antennas are comparably large in relation to UHF antennas. Low frequency tags are characterized by label style structures in which a low conductivity ink may be applied to a lower cost substrate to provide a planar antenna that is non-resonant. Such a tag antenna may, by way of example only, be 2×2 inches in size and less than ⅟32 inches in cross section. Furthermore, when the low frequency tag antenna is increased in size the range typically increases. Therefore, the larger the compartment, the larger the antenna that can be protectively accommodated inside the pallet, and therefore the greater the tag read range. Increased read range is regarded as beneficial in most cases.

Furthermore, it is known that when the conventional antennas of the reader and the tag are perpendicular to the direction of the signal that there is more effective communication there between the two. Therefore, the tag antenna structures may preferably occupy designated space inside the compartment to facilitate a preferred reader to tag orientation. In association with this requirement, one low frequency tag may contain three antennas in three orientations, as will be discussed below.

Readers 86 may be fixed, mounted or hand held. In a first setting there may be a portal arrangement in which the reader comprises a reader antenna array 88a situated on vertical column. A preferred tag antenna orientation 92 for this setting would be vertical. In a second setting the reader antenna array 88b may be situated above or below the path traveled by the tag, and the favored tag antenna orientation 94 would be horizontal. In a third setting the reader antenna array 88c is mounted on a fork lift, and the preferred vertical tag antenna orientation 98 may be perpendicular to vertical orientation 92. In order to facilitate the full range of preferred tag orientations 92 94 and 98 it may be necessary to rotate the pallet 90° in order to provide proper orientation in any of the three settings suggested. Alternatively it may be helpful to provide a tag that is best orientated parallel to the direction of the signals, as is known in the art in connection with RFID systems for books, file folders and the like. As this extra work or correction would be inconvenient and slow the pace of the pallet's movement through the supply chain an antenna 100 can be segmented into three sections 102, 104 and 106 such that the tag substrate is folded as indicated at 108, along creases 110. Additionally, the tag may be structured so that on each of the three surfaces there is, by way of example only, a multi-frequency antenna array 112a, 112b and 112c, comprising a low frequency antenna 114 and high frequency antennas 116 and 118. The three antenna arrays 112 are connected to a tag module indicated 120 including at least an IC to provide a unique ID and circuitry for coupling the antenna arrays 112 with a wide range of readers and reader positions as the pallet moves throughout the supply chain. Therefore to insure the pallet is able to move through different settings it would be important that the compartment facilitate a number of larger rather than a smaller antenna and orientations (i.e. "X", "Y" and "Z" planes) of the present invention.

By way of further explanation, the antenna arrays 112 can be sub-divided further into discreet antenna structures such that the antenna structures on each surface can communicate within different frequency bands, such as with a dipole antenna wherein one pole 116 resonating at 915 MHz communicates with a first reader and a second pole 118 resonating at 2.45 GHz communicates with a second reader. In this fashion the tag can be developed to communicate with a plurality of readers distributed throughout the supply chain.

Figure 9:
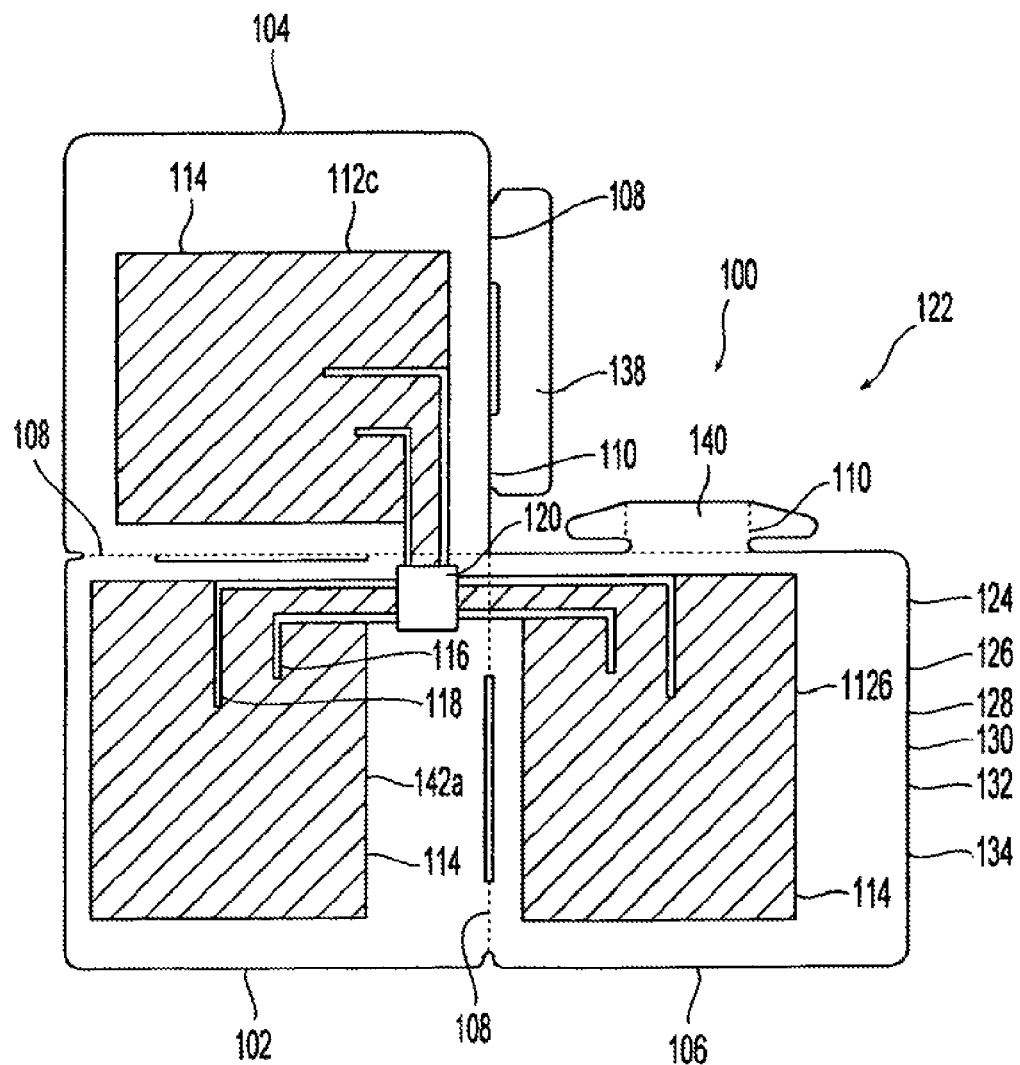
FIG. 9 is a plan view of one embodiment of an RFID tag comprising three sections and showing within each section a plurality of antenna structures.
Figure 9A:
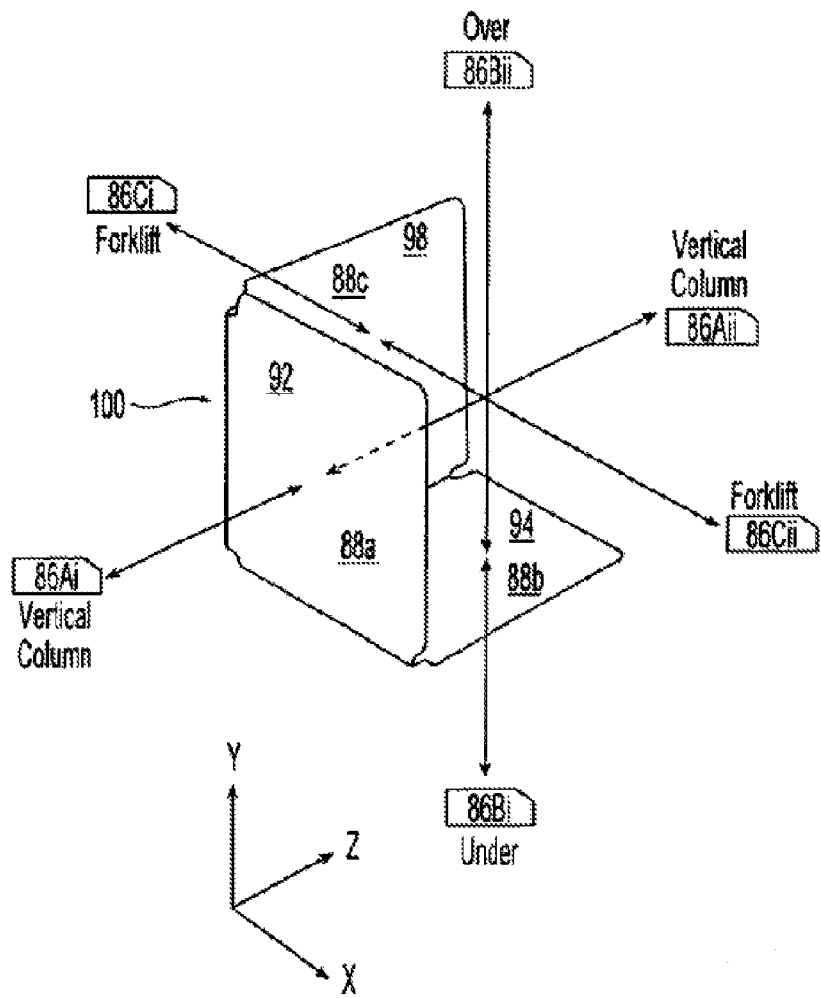
FIG. 9A is a perspective view of the RFID tag in FIG. 9 assembled for use inside a pallet cavity for radio frequency communication.
Figure 9B:
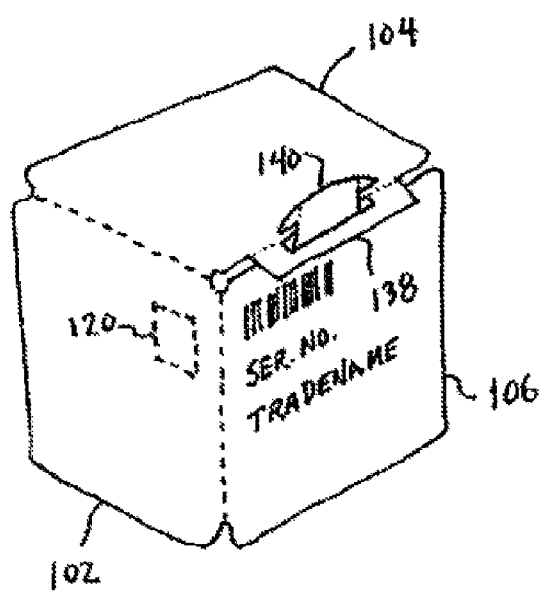
FIG. 9B is a perspective view of the RFID tag in FIG. 9A showing the male tab 140 positioned in the female tab 138 for assembly purposes.

The identification device of FIG. 9, indicates a top view of a label style RFID device 122 comprising at least one of a substrate layer 124, a dielectric layer 126, a conductive layer 128, and adhesive layer 130 and a printed layer 132 to provide semi rigid carrier 134 onto which an tag module (IC) 120 is attached. Other circuitry may also be included in the module or associated with the module on the carrier to switch from one antenna frequency band to another or to communicate over more than one frequency simultaneously. There are three sections 102, 104 and 106 made evident when the tag 122 is formed (for example steel rule die). The three sections are made along crease lines 110 that permit the carrier to be orientated parallel with the reader antenna arrays in three planes. The carrier fold is retained in place by male and female tabs 138 and 140 or any other means forming three antenna bearing planes. Such an arrangement enjoys superior communication with a multitude of reader positions.

It may also be recognized that the first identification device may coexist with a second communication device. Hence the need for capacity in the size of the compartment. For example, futurists project a 10 percent improvement in worldwide GDP as a consequence of the deployment of wireless communications involving RFID, sensors and actuators.

Therefore, whether the identification device uses band width in the 830 megahertz (cellular), 13.56 megahertz (RF), 1.6 gigahertz (GPS), 1.7-1.9 gigahertz (PCS), 2.4 gigahertz (Bluetooth), 5.8 gigahertz (IEEE802.1 standard for LAN) or surface acoustic wave (SAW), the antenna(s) thereof can be accommodated inside the compartment.

The prior art of RFID is indicated in FIG. 10 in which a distributed network of readers 142 is deployed to convey data to and from a host 144 and a plurality of tags 146. Today's ID devices including RFID tags are adapted to flourish in the "ideal" reader distributed network 142, where middleware can diagnose and use the data for operational purpose, broadly defined, captured by the system. In the real world however, the RF environment is really indicated by FIG. 11, in which there are a multitude of competitive, proprietary and legacy non-interoperating systems including overlapping distributed reader networks 148, a plurality of non-interactive hosts 150 and a multitude of incompatible tags 152, plus transnational jurisdictional constraints. Together these elements have withheld consensus on a universal agreement on protocol standards.

Figure 12:
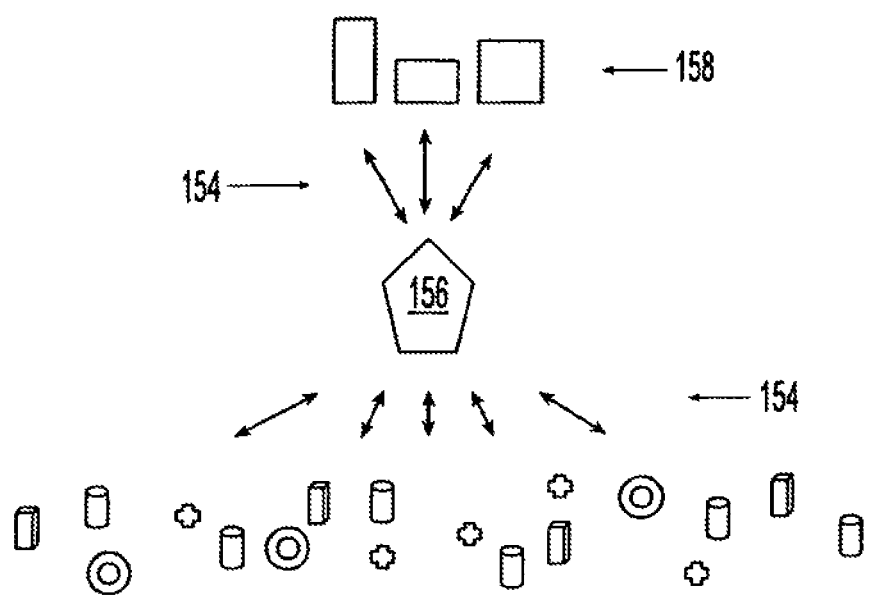
FIG. 12 is a diagram illustrating the invention wherein a cellular network is used to provide a communication link between a pallet ID device and a supply chain host.

Accordingly, "next" generation systems of the inventions hereof are indicated, by way of example, in FIG. 12, in which a pallet communicates directly through a cellular network 154 to a network host 156, without using the distributed network of readers. (Several cellular systems exist to encourage competition of service.) There may be local area interrogators associating the pallet within the a local area supply chain to identify the unit load (i.e. items having associated optical, acoustic or RF identification devices), but the cellular equipment on board the pallet obviates the need to establish distributed networks of readers and is more efficient as the cellular networks already exist.

The association of sensors with local and far range communicators is also contemplated in the present invention. For example, a second identification device 160 could be provided on a rigid circuit board 162, also comprising RF tags for conventional track and trace functionality, for far range wireless communication capability. In one setting a customized pallet is utilized in the storage and transportation of a hazardous material in a multi warehouse supply chain. Each customized pallet is adapted to comply with standards within the jurisdiction that relate to the safekeeping of the hazardous material, such that external environmental conditions, including high temperature exposure, although any external condition or indicator could be monitored, are recorded in real time, such that upon the occurrence of a catastrophic high heat event the second communication device 160 could send out a 911 emergency call to effect the implementation of an emergency protocol. Therefore, in one embodiment the pallet may include a thermo graphic sensor 164 in the base 6 to monitor temperature and upon detection of indications of high or low temperature outside a proscribed range, actuates a LAN communicator 166 in said base to transmit a signal to a LAN receiver 168 in the deck 2, wherein circuitry actuates a cellular communicator 170 to dispatch a 911 signal in association with a unique identification code to identify the pallet and its unit load along with external temperature conditions. Such a capability would improve the productivity of emergency responders and reduce the consequences of environmental damage and distress on a community in the event of hazardous material accidents.

In the present case the second communication device 160 is not developed to communicate with a host over the 2.4 GHz or the 5.8 GHz bands because of the intermediate read ranges of these frequencies (although in other embodiments of pallets more than one band may be utilized for local use, such as by fire and emergency respondents, who within range of 100 yards would be able to read "emergency instruction" signals emanating from the pallet over a Bluetooth hand held or on-board LAN vehicle communication system.) For Example, the pallet may be on the move from one plant to another and there would be a need to communicate instantaneously hundreds of miles in the event of an accident. To achieve this purpose the second identification device includes at least a second antenna, such an 830 megahertz helical coil antenna 172 operating in a cellular frequency band that can send a signal generated by the 911 protocol contained in the IC. The cellular communications components could exist within a separate module added to an identification device or could populate the circuit board along with other devices and modules of the identification device.

The cellular module 170 would be low cost. One must remember that there are 2.2 billion pallets in use in North America. The demand worldwide for cellular enabled pallets could be in range of hundreds of millions, providing sufficiently large economies in scale to reduce the cost of simple cellular devices considerably. The embodied cellular module excludes at least one of a touch pad, a screen, a mouthpiece, a speaker, a camera, a vibrator, and a plastic housing which all add costs, and only includes a circuit board and at least one of a transmitting/receiving antenna (i.e. 172), a digital signal processor, a memory chip, an identification reader card, circuitry, and one of an internal or an external power supply. Indeed, the cellular module would be disposable to extent that the value added benefits of remote data transfer would be captured by the cellular network host through the sale of used band width or the like over a period of use, as is the routine with cellular telephony. One would assume the cellular module would be given away to lock up the income stream that will result from a service contract involving the use of digital bandwidth.

Figure 13:
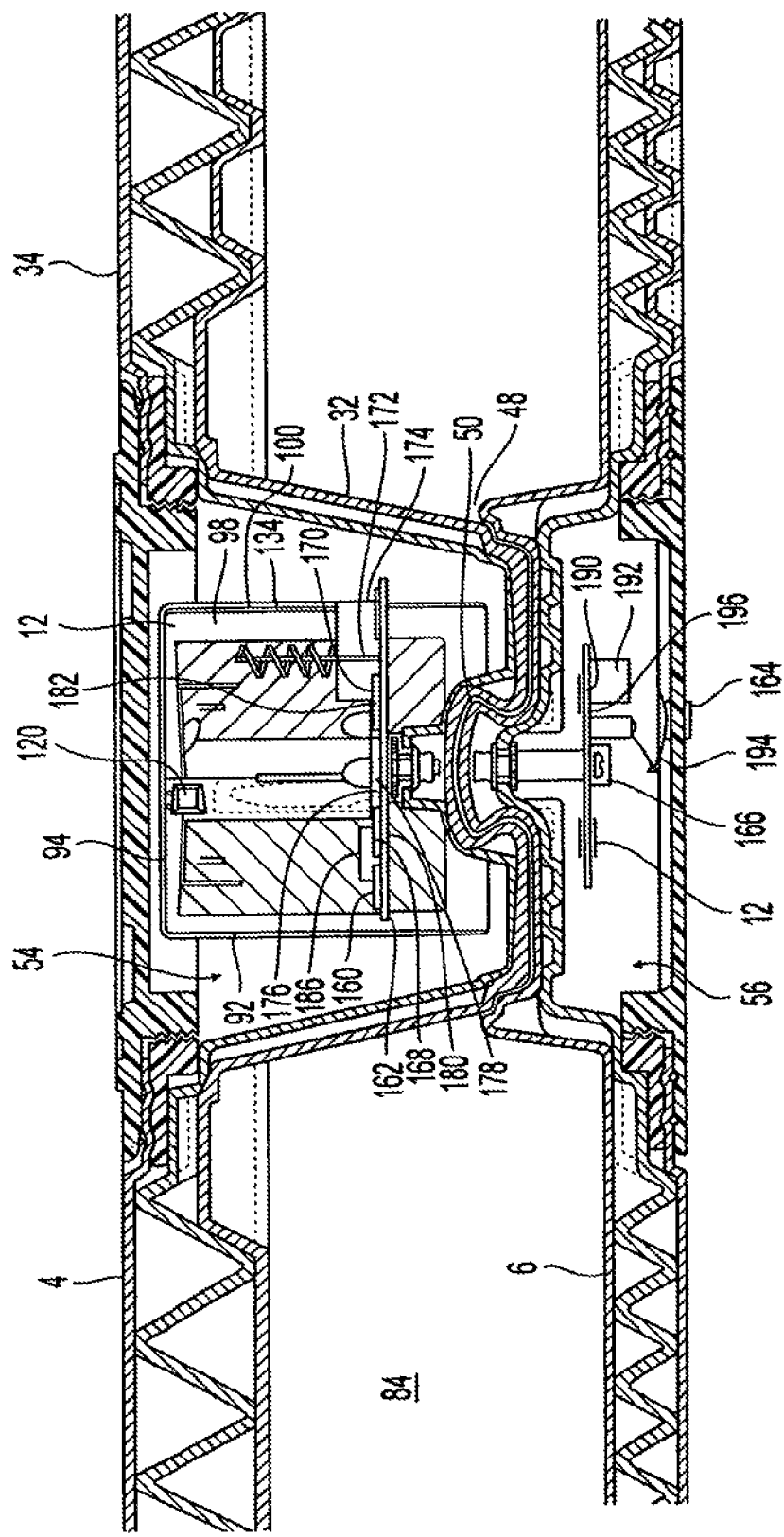
FIG. 13 is a side elevation section showing the combination of the deck and the base of FIGS. 7 and 8 respectively wherein the ID devices and communications modules of the invention are protectively housed within the compartments of the present invention.

Other devices that may populate the circuit board(s) in the respective compartments of a pallet are suggested in FIG. 13 in which at least one of the following components are contemplated: power supplies 174 (including conventional batteries, mechanical renewable power supply devices, solar batteries and RF energy harvesting apparatus); antenna arrays 176; Bluetooth communications modules 178; LAN communications modules 180; PCS communications modules 182; cellular communications modules 184; GPS communications modules 186; an interrogation module 188; RFID communications modules or tags 190; sensor modules 192; sensor probe assemblies 194; integrated circuitry and memory devices 196.

Figure 14:
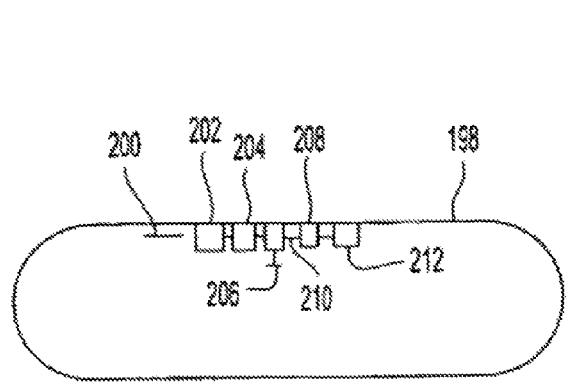
FIG. 14 is a side view of a section of a fuel tank for moving vehicles showing an electronic device with a RFID device, a wireless communications module, a sensor module, a sensor assembly, an actuator and a power supply.
Figure 16:
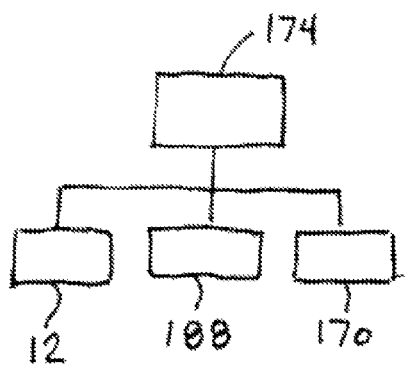
FIG. 16 is a schematic showing the RFID pallet tag, RFID reader/writer interrogator and communications modules receiving power from the battery and power resource.

Referring now to FIG. 14 there is seen a fuel tank 198, such as a fuel tank for an automobile, containing an ID device 200 selected from a group of at one of a passive tag, a battery-powered semi-passive tag or an active tag. In addition, the fuel tank contains at least one of wireless communications device 202 selected from a group comprising a Bluetooth communications module, a LAN communications module, a PCS communications module, a cellular communications module, a GPS communications module, and an interrogation module. Furthermore, the fuel tank includes at least one sensor module 204, a sensor probe assemblies 206, and actuator 208, integrated circuitry and memory devices 210, and a power supply 212.

Figure 15:
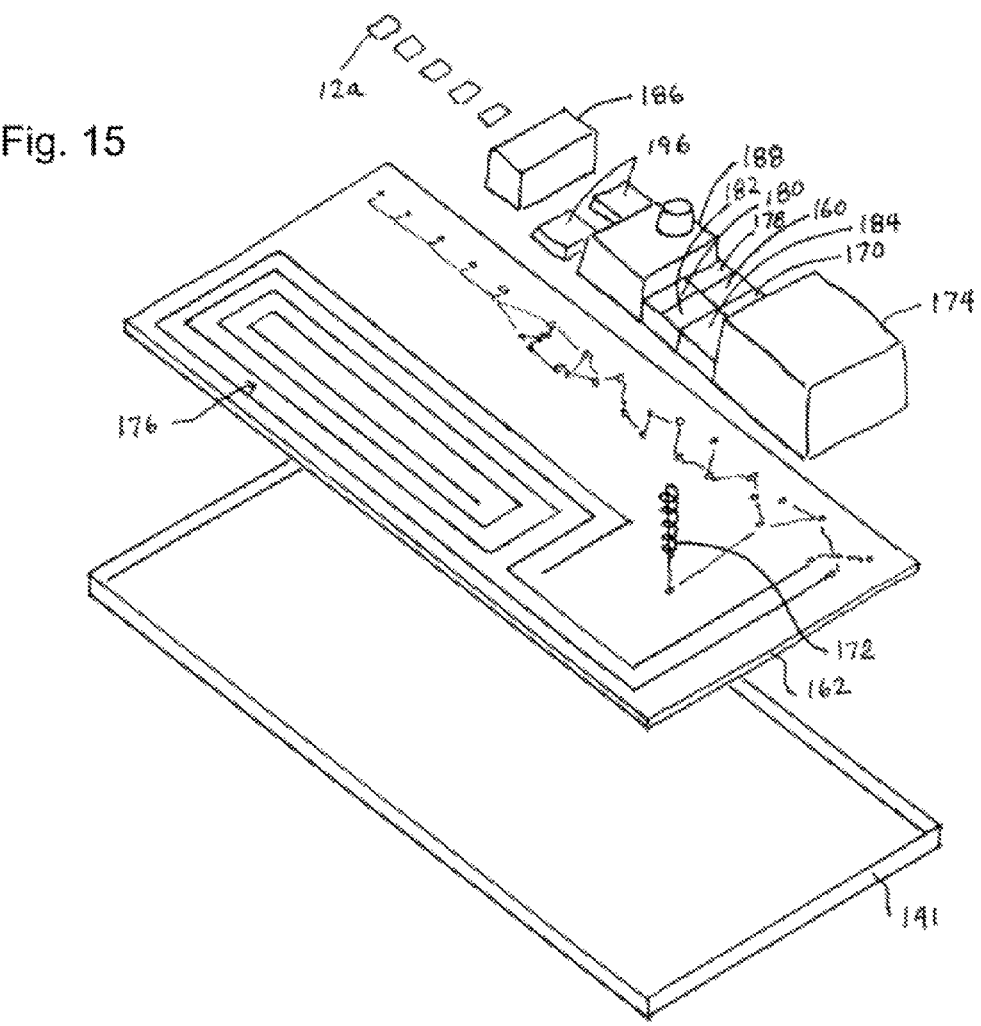
FIG. 15 is an exploded perspective view of the electronic equipment inside the upper compartment of the pallet shown in FIG. 13.

Referring now to FIG. 15 a view of the circuit board assembly contained in the compartment of the deck is shown and described.

FIG. 15 shows the rigid circuit board assembly 162 shown the top compartment 54 of the deck of the pallet in FIG. 13. The pallet apparatus may include a second or more rigid circuit board assemblies, such as the one illustrated in the bottom compartment 56 of the base of the pallet in FIG. 13. At least one circuit board includes an RFID reader/writer interrogator configured to identify a plurality or sub-set of the RFID item tags associated with articles supported upon the pallet, in order to conduct an inventory check to maintain an accurate pallet manifest and record.

As indicated in FIG. 1, the top surface of the pallet is adapted to support a load of articles. The RFID reader/writer interrogator is positioned on the pallet and configured to direct a radio frequency query signal to the load of articles in order to establish a communications link with the RFID item tags affixed to the articles of a dynamic pallet load. As seen in FIG. 13, RFID reader/writer interrogator 188 is located on the circuit board positioned in the compartment adjacent to the load surface.

The one or more RFID reader/writer interrogators are also optionally in communication with RFID pallet tags. A plurality of RFID pallet tags may be positioned on one pallet. FIG. 14 shows a circuit board with five RFID pallet tags. For example, one such tag may be dedicated to manufacturing, material and recycle information storage. One tag may be specifically adapted for pallet tracking within the distribution system. The pallet may also host a third RFID device specified by third parties for specialized inventory tracking activities within closed-loop or associated distribution networks. A fourth tag may be developed to consolidate the data arrays of several tags attached to items transported upon the pallet for more efficient data compression and transfer. A fifth tag may be adapted for interfacing with the RFID system deployed by the trucking industry. FIG. 15 shows a schematic of a power supply arrangement for the RFID pallet tags.

The one or more RFID reader/writer interrogators are also optionally in communication the RFID beacon tags positioned in RFID networks distributed along the pathways take by the pallet. The RFID reader/writer interrogator communicates with external RFID tags directly, and obtains data indicative of the RFID beacon tags from the RFID pallet tags.

A pallet position determination can be made when the RFID reader/writer interrogator obtains a radio frequency signal from an RFID beacon tag or the RFID pallet tag obtains a radio frequency signal from an external RFID reader/writer interrogator, such as a door way portal.

As seen in FIG. 14, the circuit board assembly 162 includes an electromagnetic interference (EMI) shield 141. The EMI shield is positioned below the support surface and the RFID reader/writer interrogator is positioned between the EMI shield and the support surface. The EMI shield is beneficially positioned to reflect the query signals from the RFID reader/writer interrogator toward the intended articles or sub-set of articles in the pallet load. The EMI shield also is provided to prevent tag reading interference. The RFID reader/writer interrogator may also utilize a directional antenna in order to ensure the RFID reader/writer interrogator can reliably conduct a real-time inventory of the goods on the pallet.

The RFID reader/writer interrogator may utilize an array of antennas in order to communicate with a plurality of RFID tags indicative of the pallet load, condition and location. The integrated communication modules for connecting the RFID reader/writer interrogator to the LAN, WLAN and cellular networks each contain additional antenna, so that the pallet apparatus can have a dozen antennas if each of the five RFID pallet tags shown in FIG. 14 have a separate antenna. The RFID reader/writer interrogator can have an antenna array operating on several radio frequencies and the LAN, WLAN and cellular modules can have more than one antenna for multiple communications purposes.

Any combination of devices could be assembled to provide a pallet with a plurality of IDs and functional properties. A combination of devices can be situated in a plurality of compartments. From time to time the cover can be removed to access devices within a compartment so that the devices can be changed to customize a pallet for an intended application. In other cases the compartment is populated with plurality of devices that operate in multiple operating environments prevalent throughout the supply chain.

The inventions contemplate using the Internet for the sharing of data obtained from the devices. The Internet is also used to deliver data processed by a host to the devices. The Internet connection can be made remotely through an interrogator with a direct or indirect connection to the Internet or internally by one or more of communications devices located in the pallet.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A positioning, monitoring and reporting system for a pooled material handling apparatus comprising:
a reusable pallet for storing and shipping unit loads; and
a battery operated device for communicative coupling with first and second wireless networks, said first network being a local area network (LAN) and said second network being a national cellular network,
said battery operated device including a local area network communications module having a first antenna that communicates with other communications devices in the local area network on a first frequency to thereby acquire first data concerning a time, place and condition of the pallet and its unit load, and
said battery operated device including a digital cellular communications module having a second antenna that communicates within the national cellular network on a second frequency to thereby acquire second data concerning a time, place and condition of the pallet and its unit load, the second frequency being different from the first frequency.

2. The system of claim 1 wherein:
the first data from the local area network and the second data from the national cellular network are combined at an internet portal for accessing the first and second data.

3. The system of claim 2 wherein:
the battery operated device is pre-configurable using the internet portal by a user of the pallet to define at least one of predetermined positioning, monitoring, and reporting features.

4. The system of claim 2 wherein:
the battery operated device is permanently configurable using the internet portal by an owner of the pallet to define at least one of predetermined positioning, monitoring, and reporting features.

5. The system of claim 1 wherein:
the local area network communications and digital cellular communications modules draw their power from a battery having a pre-determined supply of power, the local area network communications and digital cellular communications modules integrating a microprocessor for controlling the draw of power from said battery.

6. The system of claim 5 wherein:
the draw of power is determined by a user's pre-configuration, said draw of power being higher or lower dependent upon a value of the unit load.

7. The system of claim 1 further comprising at least one of a unit load device (ULD), industrial bulk container (IBC), reusable product container (RPC), returnable transport item (RTI).

8. The system of claim 1 wherein said device including said local area network communications module having said first antenna that communicates with other communications devices in the local area network at the first frequency comprises said device including said local area network communications module having said first antenna that sends and receives data with said other communications devices in the local area network at the first frequency; and
wherein said device including said digital cellular communications module having said second antenna that communicates within the national cellular network at the second frequency comprises said device including said digital cellular communications module having said second antenna that sends and receives data within the national cellular network at the second frequency.

9. A reusable transport pallet including:
a battery powered device for tracking, monitoring and reporting a time, place and condition data for the pallet,
said device including an IEEE 802.n wireless component having a first antenna for communicating with other IEEE 802.n wireless devices in a local area network on a first frequency to thereby acquire first data concerning a time, place and condition for the pallet, and
a digital cellular communications module having a second antenna for communicating within a national cellular network on a second frequency to thereby report the first data and acquire second data concerning a time, place and condition for the pallet, the second frequency being different from the first frequency.

10. The reusable transport pallet of claim 9 wherein:
the wireless component and cellular module are integrated with a common power supply.

11. The reusable transport pallet of claim 10 wherein:
first tracking, monitoring and reporting instructions for operating the wireless component and the cellular module are pre-programmed for each subsequent pallet trip, said instructions based upon first user-defined criteria for each unit load to be shipped or stored on the reusable pallet for a rental trip.

12. The reusable transport pallet of claim 11 wherein:
second tracking, monitoring and reporting instructions for operating the wireless component and the cellular module are pre-programmed based upon user-defined criteria defined by a pool operator for managing the lifecycle of the pallet.

13. The reusable transport pallet of claim 12 wherein:
said second instructions involve disabling the first instructions at the end of the rental trip to reduce power consumption from the common power supply.

14. The reusable transport pallet of claim 11 wherein:
responsive to a time, place or condition in said first and second data, said tracking, monitoring and reporting instructions are adjusted according to a second user-defined criteria, said second user-defined criteria being different than said first user-defined criteria.

15. The reusable transport pallet of claim 9 wherein:
responsive to a deviation from a time, place or condition contained in said first and second data, said tracking, monitoring and reporting instructions for one of the wireless component and the cellular module are adjusted to acquire and report said first and second data.

16. A reusable transport pallet including:
a battery powered electronic tracking device having first and second communications means,
the first means including a IEEE 802.n component for establishing wireless communications at a first frequency with other IEEE 802.n devices in a local area network (LAN), the local area network providing first time, place and condition information indicative of the pallet's immediate environment, and
the second means including a cell phone component for establishing communication at a second frequency with a national digital cellular network for communicating time, place and condition information obtained from the first means and for providing second time, place and condition information indicative of the pallet's nationwide status, the second frequency being different than the first frequency.

17. The reusable transport pallet of claim 16 wherein:
the IEEE 802.n component uses a first antenna to read and write to and from other IEEE 802.n devices within LAN range during a pallet's rental trip.

18. The reusable transport pallet of claim 16 wherein:
the cell phone component uses a separate antenna to send and receive messages over the cellular network,
said sent messages including information from the IEEE 802.n component and said received messages including information to the IEEE 802.n component.

19. The reusable transport pallet of claim 16 wherein:
the IEEE 802.n component and the cell phone component are integrated together and share a common power resource.

20. The reusable transport pallet of claim 16 wherein:
the cell phone component includes a pallet identification reader card (SIM card) to identify the pallet in the national cellular network.

21. The reusable transport pallet of claim 20 wherein:
the components are integrated onto a common platform and have access to sensors for monitoring a time, place or condition including at least one of temperature, impact, motion, and unit load.

22. The reusable transport pallet of claims 21 wherein:
at least one of a managing entity of a pool of said pallets and a user of said pallet is responsive to time, place and condition information received from the sensors.

23. A material handling pallet comprising:
a battery powered device including at least one of a cellular modem and an IEEE 802.n wireless component for communicative coupling with one or more communications networks,
said cellular modem and said IEEE 802.n wireless component including a microprocessor having controllable means for consuming battery power from a battery resource in order to perform pre-programmed positioning, monitoring and reporting instructions, and
said controllable means preselected by one of a customer using the pallet or a pallet pooling operator managing the pallet.

24. The material handling pallet of claim 23 wherein:
the battery powered device includes a power generation module enabling the pallet to remain in circulation indefinitely,
said power generation module captures and stores energy resulting from at least one of the movement of the pallet and rectification of RF signals in the pallet environment.

* * * * *